US010375434B2

(12) United States Patent
Heinz, II et al.

(10) Patent No.: US 10,375,434 B2
(45) Date of Patent: Aug. 6, 2019

(54) REAL-TIME RENDERING OF TARGETED VIDEO CONTENT

(71) Applicant: Amazon Technologies, Inc., Reno, NV (US)

(72) Inventors: Gerard Joseph Heinz, II, Seattle, WA (US); Michael Schleif Pesce, Seattle, WA (US); Collin Charles Davis, Seattle, WA (US); Michael Anthony Frazzini, Seattle, WA (US); Ashraf Alkarmi, Seattle, WA (US); Michael Martin George, Mercer Island, WA (US); David A. Limp, Medina, WA (US); William Dugald Carr, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/317,984

(22) Filed: Jun. 27, 2014

(65) Prior Publication Data

US 2015/0264416 A1 Sep. 17, 2015

Related U.S. Application Data

(60) Provisional application No. 61/951,501, filed on Mar. 11, 2014.

(51) Int. Cl.
*H04N 7/10* (2006.01)
*H04N 21/2668* (2011.01)
(Continued)

(52) U.S. Cl.
CPC ... *H04N 21/2668* (2013.01); *H04N 21/23412* (2013.01); *H04N 21/25883* (2013.01);
(Continued)

(58) Field of Classification Search
CPC ............ H04N 21/812; H04N 21/4532; H04N 21/25883; H04N 21/25891;
(Continued)

(56) References Cited

U.S. PATENT DOCUMENTS 5,261,820 A 11/1993 Slye et al.
5,395,242 A 3/1995 Slye et al.
(Continued)

OTHER PUBLICATIONS

Wang, Jinjun, et al., "Sports highlight detection from keyword sequences using HMM", Multimedia and Expo, 2004, ICME'04, IEEE International Conference, pp. 1-5, vol. 1.
(Continued)

*Primary Examiner* — Annan Q Shang
(74) *Attorney, Agent, or Firm* — Robert C. Kowert; Meyertons, Hood, Kivlin, Kowert & Goetzel, P.C.

(57) ABSTRACT

A real-time video targeting (RVT) system may leverage network-based computation resources and services, available 2D or 3D model data, and available viewer information to dynamically personalize content of, or add personalized content to, video for particular viewers or viewer groups. When playing back pre-recorded video to viewers, at least some objects or other content in at least some of the scenes of the video may be replaced with objects or content targeted at particular viewers or groups according to profiles or preferences of the viewers or groups. Since the video is being rendered and streamed to different viewers or groups in real-time by the network-based computation resources and services, any given scene of a video may be modified and viewed in many different ways by different viewers or groups based on the particular viewers' or groups' profiles.

22 Claims, 20 Drawing Sheets

(51) Int. Cl.
*H04N 21/234* (2011.01)
*H04N 21/81* (2011.01)
*H04N 21/258* (2011.01)
*H04N 21/45* (2011.01)
*H04N 21/44* (2011.01)

(52) U.S. Cl.
CPC ... *H04N 21/44012* (2013.01); *H04N 21/4532* (2013.01); *H04N 21/812* (2013.01); *H04N 21/8146* (2013.01)

(58) Field of Classification Search
CPC ......... H04N 21/44222; H04N 21/4331; H04N 21/235; H04N 21/435
USPC .............................. 725/34–36; 709/217–232
See application file for complete search history.

(56) References Cited

U.S. PATENT DOCUMENTS

| | | | |
|---|---|---|---|
| 5,585,858 A * | 12/1996 | Harper | G09B 5/065 348/473 |
| 5,682,196 A * | 10/1997 | Freeman | G06F 3/011 345/419 |
| 5,684,918 A * | 11/1997 | Abecassis | A63F 13/10 348/14.01 |
| 5,953,485 A * | 9/1999 | Abecassis | A63F 13/10 386/278 |
| 5,953,506 A * | 9/1999 | Kalra | G06T 3/4092 345/428 |
| 6,173,260 B1 | 1/2001 | Slaney | |
| 6,275,806 B1 | 8/2001 | Pertrushin | |
| 6,289,165 B1 * | 9/2001 | Abecassis | G11B 19/02 348/E5.105 |
| 6,504,990 B1 * | 1/2003 | Abecassis | G11B 19/02 348/E5.105 |
| 6,609,253 B1 * | 8/2003 | Swix | G11B 27/005 348/E7.073 |
| 6,754,905 B2 * | 6/2004 | Gordon et al. | 725/38 |
| 7,451,079 B2 | 11/2008 | Oudeyer | |
| 7,500,258 B1 * | 3/2009 | Eldering | 725/32 |
| 7,606,701 B2 | 10/2009 | Degani et al. | |
| 7,803,052 B2 | 9/2010 | Multerer et al. | |
| 7,940,914 B2 | 5/2011 | Pertrushin | |
| 8,078,470 B2 | 12/2011 | Levanon et al. | |
| 8,096,863 B2 | 1/2012 | Annunziata | |
| 8,308,562 B2 | 11/2012 | Patton | |
| 8,391,774 B2 * | 3/2013 | Arseneau | G06F 1/1626 455/3.06 |
| 8,495,675 B1 * | 7/2013 | Philpott | H04H 20/103 725/105 |
| 8,578,432 B2 * | 11/2013 | Vasudevan | H04N 21/2385 370/486 |
| 2001/0041053 A1 * | 11/2001 | Abecassis | A63F 13/10 386/291 |
| 2002/0068525 A1 * | 6/2002 | Brown | G06Q 20/108 455/3.01 |
| 2002/0166123 A1 * | 11/2002 | Schrader | G11B 27/105 725/58 |
| 2006/0136581 A1 * | 6/2006 | Smith | H04L 41/145 709/224 |
| 2006/0184994 A1 * | 8/2006 | Eyer | H04N 21/2335 725/136 |
| 2007/0024612 A1 | 2/2007 | Balfour | |
| 2007/0088674 A1 * | 4/2007 | Kawate | G06F 17/30858 |
| 2007/0200183 A1 * | 8/2007 | Rueb | H01L 29/0611 257/401 |
| 2008/0131091 A1 * | 6/2008 | Mae | G11B 27/034 386/241 |
| 2008/0260352 A1 * | 10/2008 | Turner | H04N 5/76 386/241 |
| 2008/0300700 A1 | 12/2008 | Hammer et al. | |
| 2009/0040890 A1 * | 2/2009 | Watanabe | G11B 7/00736 369/47.15 |
| 2010/0122284 A1 * | 5/2010 | Yoon | H04N 5/4401 725/33 |
| 2010/0180296 A1 * | 7/2010 | Hendricks | H04H 20/10 725/34 |
| 2011/0043614 A1 * | 2/2011 | Kitazato | H04N 13/0059 348/51 |
| 2011/0302613 A1 * | 12/2011 | Joshi | H04N 7/17318 725/60 |
| 2012/0019621 A1 * | 1/2012 | Song | H04N 21/236 348/46 |
| 2012/0052476 A1 | 3/2012 | Graesser et al. | |
| 2012/0167134 A1 | 6/2012 | Hendricks et al. | |
| 2012/0198493 A1 * | 8/2012 | Oklejas | A61M 21/02 725/36 |
| 2012/0265892 A1 * | 10/2012 | Ma | H04N 21/23418 709/231 |
| 2012/0293638 A1 * | 11/2012 | Roh | H04N 13/026 348/51 |
| 2013/0011121 A1 * | 1/2013 | Forsyth | G11B 27/034 386/245 |
| 2013/0129304 A1 * | 5/2013 | Feinson | H04N 5/77 386/223 |
| 2014/0019860 A1 * | 1/2014 | Sathish | G06F 3/038 715/716 |
| 2014/0136728 A1 * | 5/2014 | Xu | H04N 21/816 709/231 |
| 2014/0171039 A1 | 6/2014 | Bjontegard | |
| 2015/0039391 A1 * | 2/2015 | Hershkovitz | G06Q 10/04 705/7.31 |
| 2015/0095937 A1 * | 4/2015 | Tobin | G06F 16/48 725/32 |
| 2015/0139610 A1 | 5/2015 | Syed et al. | |
| 2015/0181301 A1 * | 6/2015 | Bloch | H04N 21/47217 725/41 |
| 2015/0235264 A1 * | 8/2015 | Curtis | G06Q 30/0255 705/14.53 |
| 2015/0382042 A1 * | 12/2015 | Wagenaar | H04N 21/26258 725/34 |

OTHER PUBLICATIONS

Ren, et al., "Affective sports highlight detection", 15th European Signal Processing Conference, Sep. 3-7, 2007, pp. 728-732.
Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.
Changsheng Xu, et al., "Live Sports Even Detection Based on Broadcast Video and Web-casting Text", Proceedings of the 14th annual ACM international conference on Multimedia, ACM, 2006, pp. 221-230.
Mehdi Kaytoue, et al. "Watch me playing, I am a professional: a first study on video game live streaming", Proceedings of the 21st international conference companion on World Wide Web, ACM, 2012, pp. 1-8.
Gifford Cheung, et al., "Starcraft from the stands: understanding the game spectator", Proceedings of the SIGCHI Conference on Human Factors in Computing Systems, ACM, 201, pp. 1-10.
Thomas P. B. Smith, et al."Live-streaming changes the (video) game." Proceedings of the 11th European conference on Interactive TV and video. ACM, 2013, pp. 131-138.
William A. Hamilton, et al., "Streaming on twitch: fostering participatory communities of play within live mixed media." Proceedings of the SIGCHI Conference on Human Factors in Computing Systems. ACM, 2014, pp. 1-10.
M.A. Anusuya, et al., "Speech Recognition by Machine: A Review", International Journal of Computer Science and Information Security, 2009, pp. 181-205, vol. 6, No. 3.
Rank Dellaert, et al., "Recgonizing Emotion in Speech", IEEE, Spoken Language, 1996, pp. 1-4 Proceedings., Fourth International Conference on. vol. 3.
Santosh K. Gaikwad, et al., "A Review on Speech Recognition Technique", International Journal of Computer Applications, Nov. 2010, pp. 16-24, vol. 10, No. 3.

(56) References Cited

OTHER PUBLICATIONS

Kiel Mark Gilleade, et al., "Affective Videogames and Modes of Affectived Gaming: Assist me, Challenge Me, Emote Me", Proceedings of DiGRA 2005 Conference, 2005, pp. 1-7.
Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.
Christian Martyn Jones, et al., "Creating an emotionally reactive computer game responding to affective cues in speech", HCI Proceedings, 2005, pp. 1-2, vol. 2.
Paul P.A.B. Merkx, et al., "Inducing and Measuring Emotion through a Multiplayer First-Person Shooter Computer Game", Proceedings of the Computer Games Workshop, 2007, pp. 1-12.
Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.
RN Schuller, et al., "Acoustic Emotion Recognition: A Benchmark Comparison of Performances", IEEE, ASRU 2009, pp. 552-557.
Norman Makoto Su, et al., "Virtual Spectating: Hearing Beyond the Video Arcade", Proceedings of the 25th BCS conference on human-computer interaction. British Computer Society, 2011, pp. 269-278.
Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.
Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.
U.S. Appl. No. 14/754,584, filed Jun. 29, 2015, Michael Anthony Willette, et al.
U.S. Appl. No. 14/754,575, filed Jun. 29, 2015, Michael Anthony Willette, et al.
U.S. Appl. No. 14/732,580, filed Jun. 5, 2015, Ethan Zane Evans, et al.
U.S. Appl. No. 14/732,582, filed Jun. 5, 2015, Ethan Zane Evans, et al.
U.S. Appl. No. 14/755,922, filed Jun. 30, 2015, David Hendrik Verfaillie et al.
U.S. Appl. No. 14/755,905, filed Jun. 30, 2015, Michael Anthony Willette et al.
U.S. Appl. No. 14/755,955, filed Jun. 30, 2015, Christopher Paul Dury et al.
U.S. Appl. No. 14/755,934, filed Jun. 30, 2015, Rohit Garg et al.
U.S. Appl. No. 14/755,944, filed Jun. 30, 2015, Robert Harvey Oates.
U.S. Appl. No. 14/755,967, filed Jun. 30, 2015, Patrick Gilmore et al.
U.S. Appl. No. 14/755,974, filed Jun. 30, 2015, Hok Peng Leung et al.
U.S. Appl. No. 14/318,093, filed Jun. 27, 2014. Michael Martin George.
U.S. Appl. No. 14/318,083, filed Jun. 27, 2014, Michael Martin George.
U.S. Appl. No. 14/318,117, filed Jun. 27, 2014, Michael Martin George.
International Search Report and Written Opinion in PCT/US15/19992, dated Jun. 29, 2015, Amazon Technologies, Inc., pp. 1-11.
U.S. Appl. No. 14/500,413, filed Sep. 29, 2014, Collin Charles Davis.
U.S. Appl. No. 14/500,451, filed Sep. 29, 2014, Michael Anthony Frazzini.
U.S. Appl. No. 14/500,619, filed Sep. 29, 2014, Christian Robert Cabanero.
U.S. Appl. No. 14/500,593, filed Sep. 29, 2014, Christian Robert Cabanero.
U.S. Appl. No. 14/500,600, filed Sep. 29, 2014, Christian Robert Cabanero.
U.S. Appl. No. 14/500,580, filed Sep. 29, 2014, Christian Robert Cabanero.
U.S. Appl. No. 14/076,815, filed Nov. 11, 2013, Jonathan Paul Thompson.
U.S. Appl. No. 14/077,180, filed Nov. 11, 2013, Gerard Joseph Heinz, II.
U.S. Appl. No. 14/077,186, filed Nov. 11, 2013, Gerard Joseph Heinz, II.
Wang, Jue, et al. "Interactive video cutout." ACM Transactions on Graphics (TOG). vol. 24. No. 3. ACM, 2005.
Smolic, Aljoscha, et al. "3d video and free viewpoint video-technologies, applications and mpeg standards." Multimedia and Expo, 2006 IEEE International Conference on. IEEE, 2006.
Karsten, Müller, et al. "View synthesis for advanced 3D video systems." EURASIP Journal on Image and Video Processing 2008 (2009).
Ballan, Luca, et al. "Unstructured video-based rendering: Interactive exploration of casually captured videos." ACM Transactions on Graphics (TOG) 29.4 (2010): 87.
Smolic, Aljoscha, Hideaki Kimata, and Anthony Vetro. "Development of MPEG standards for 3D and free viewpoint video." Optics East 2005. International Society for Optics and Photonics, 2005.
Amazon Web Services, "Amazon AppStream Developer Guide", Nov. 13, 2013, pp. 1-200.
U.S. Appl. No. 14/318,042, filed Jun. 27, 2014, Gerald Joseph Heinz, II.
U.S. Appl. No. 14/318,013, filed Jun. 27, 2014, Gerald Joseph Heinz, II.
U.S. Appl. No. 14/318,026, filed Jun. 27, 2014, Gerald Joseph Heinz, II.
U.S. Appl. No. 14/318,002, filed Jun. 27, 2014, Gerald Joseph Heinz, II.

* cited by examiner

REAL-TIME RENDERING OF TARGETED VIDEO CONTENT

This application claims benefit of priority of U.S. Provisional Application Ser. No. 61/951,501 entitled "REAL-TIME RENDERING OF TARGETED VIDEO CONTENT" filed Mar. 11, 2014, the content of which is incorporated by reference herein in its entirety.

BACKGROUND

Much video produced today, including but not limited to movies, shorts, cartoons, commercials, and television and cable programs, is at least partially generated using two-dimensional (2D) or three-dimensional (3D) computer graphics techniques. For example, modern animated movies are typically generated using various 3D computer graphics techniques as implemented by various 3D graphics applications to generate 3D representations or models of scenes, and then applying 3D rendering techniques to render two-dimensional (2D) representations of the 3D scenes. As another example, scenes in some video such as movies may be generated by filming live actor(s) using green- or blue-screen technology, and filling in the background and/or adding other content or effects using one or more 3D computer graphics techniques.

Generating a scene using computer graphics techniques may, for example, involve generating a background for the scene, generating one or more objects for the scene, combining the background and objects(s) into a representation or model of the scene, and applying rendering techniques to render a representation of the model of the scene as output. Each object in a scene may be generated according to an object model that includes but is not limited to an object frame or shape (e.g., a wire frame), surface texture(s), and color(s). Rendering of a scene may include applying global operations or effects to the scene such as illumination, reflection, shadows, and simulated effects such as rain, fire, smoke, dust, and fog, and may also include applying other techniques such as animation techniques for the object(s) in the scene. Rendering typically generates as output sequences of 2D video frames for the scenes, and the video frame sequences may be joined, merged, and edited as necessary to generate final video output, for example a movie.

Figure 1:
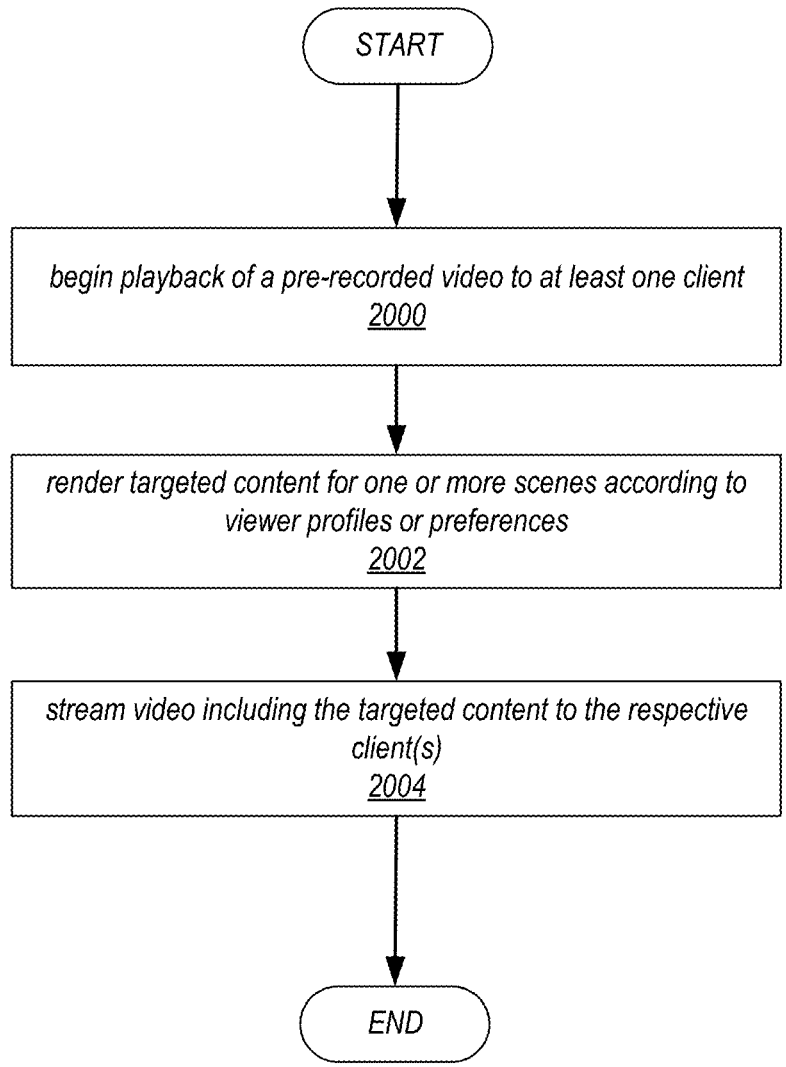
FIG. 1 is a high-level flowchart of a method for rendering and streaming targeted video content to viewers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for real-time rendering of targeted video content are described.

Video, including but not limited to movies, may be produced using 2D or 3D computer graphics techniques to generate 2D or 3D modeled worlds for scenes and render representations of the modeled worlds from selected camera viewpoints as output. 2D or 3D production techniques may be used, for example, in producing fully rendered, animated video content according to computer graphics techniques, as well as in producing partially rendered video content that involves filming live action using green- or blue-screen technology and filling in the background and/or adding other content or effects using computer graphics techniques.

2D or 3D graphics data may be used in generating and rendering the content in the scenes for video according to the computer graphics techniques. For a given scene, the graphics data may include, but is not limited to, 2D or 3D object model data such as object frames or shapes (e.g., wire frames), wraps for the frames, surface textures and patterns, colors, animation models, and so on, that is used to generate models of objects for the scene; general scene information such as surfaces, vanishing points, textures, colors, lighting sources, and so on; information for global operations or effects in the scenes such as illumination, reflection, shadows, and simulated effects such as rain, fire, smoke, dust, and fog; and in general any information or data that may be used in generating a modeled world for the scene and in rendering 2D representations of the world (e.g., video frames) as video output. The 2D or 3D graphics data may include data used to render objects representing particular types of devices, particular products, particular brands of products, and so on. For example, a model may be generated to model a particular object such as a soft drink can, and the model may be wrapped with a label representing a particular type or brand of soft drink. As another example, a model may itself represent a particular type or brand, for example a particular bottle shape used by a soft drink brand, or a particular automobile.

Generally, in video production, scene content (e.g., 2D or 3D objects, textures, colors, backgrounds, etc.) is determined for each scene, a camera viewpoint or perspective is pre-selected for each scene, the scenes (each representing a 2D or 3D world) are generated and rendered according to computer graphics techniques, and the final rendered output video (e.g., a movie) includes a representation of the modeled worlds, with each frame of each scene rendered and shown from a fixed, pre-selected camera viewpoint and angle, and with fixed, predetermined content. Thus, conventionally, a consumer of pre-rendered video (e.g., a movie) views the scenes in the movie from pre-selected camera viewpoints and angles, and with pre-determined content.

However, the 2D or 3D graphics data used to generate the video content, as well as other graphics data, may be available. Embodiments of a real-time video targeting (RVT) system are described that may leverage available 2D or 3D graphics data and viewer information to dynamically personalize content of, or add personalized content to, video for particular viewers or viewer groups. Using embodiments, video (e.g., a movie) can be pre-recorded, and when played back to viewers, at least some objects in at least some of the scenes of the pre-recorded video may be dynamically replaced with objects targeted at particular viewers or viewer groups such as families or roommates according to profiles or preferences of the viewers or viewer groups.

Figure 12:
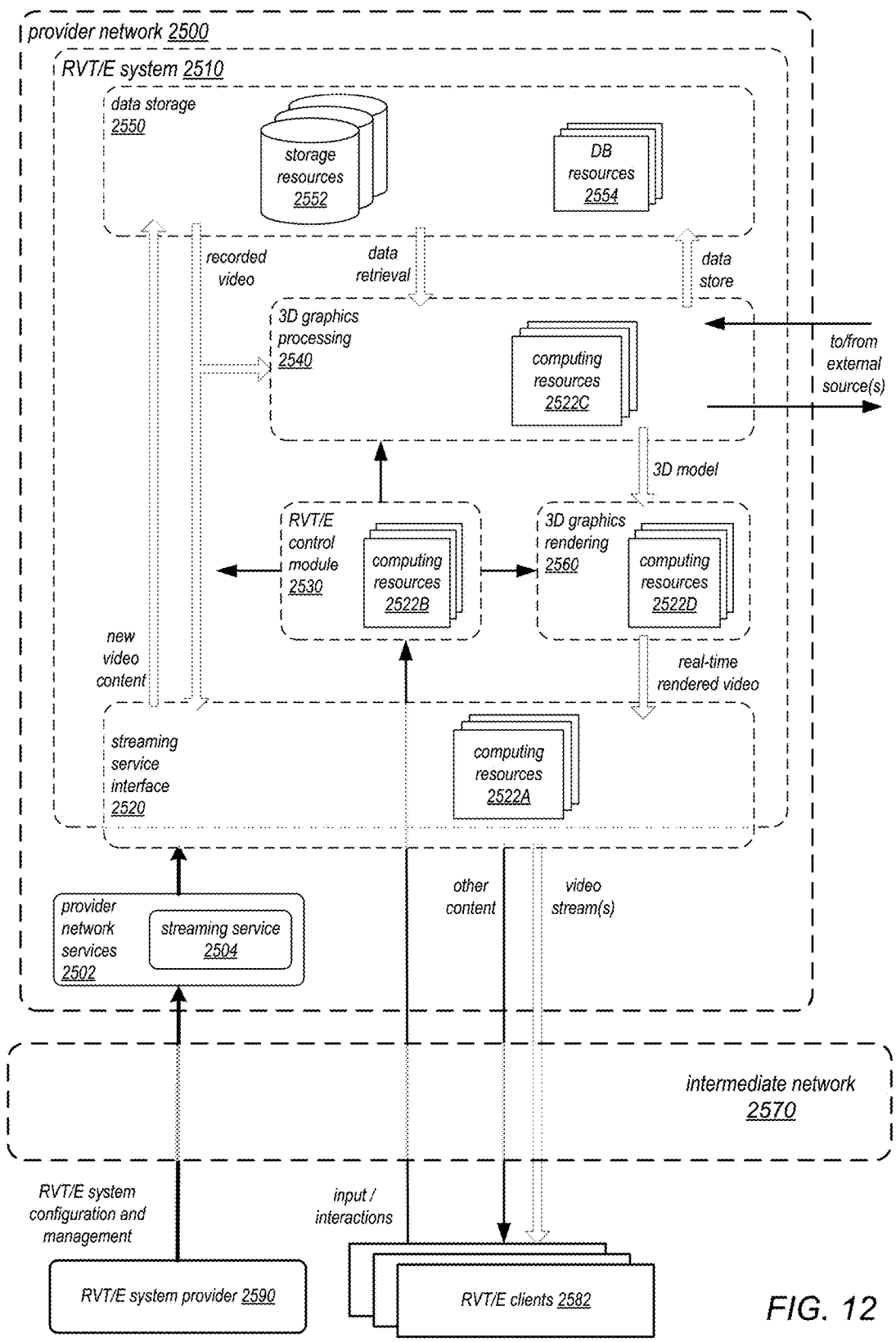
FIG. 12 illustrates an example network-based RVE environment, according to at least some embodiments.
Figure 13:
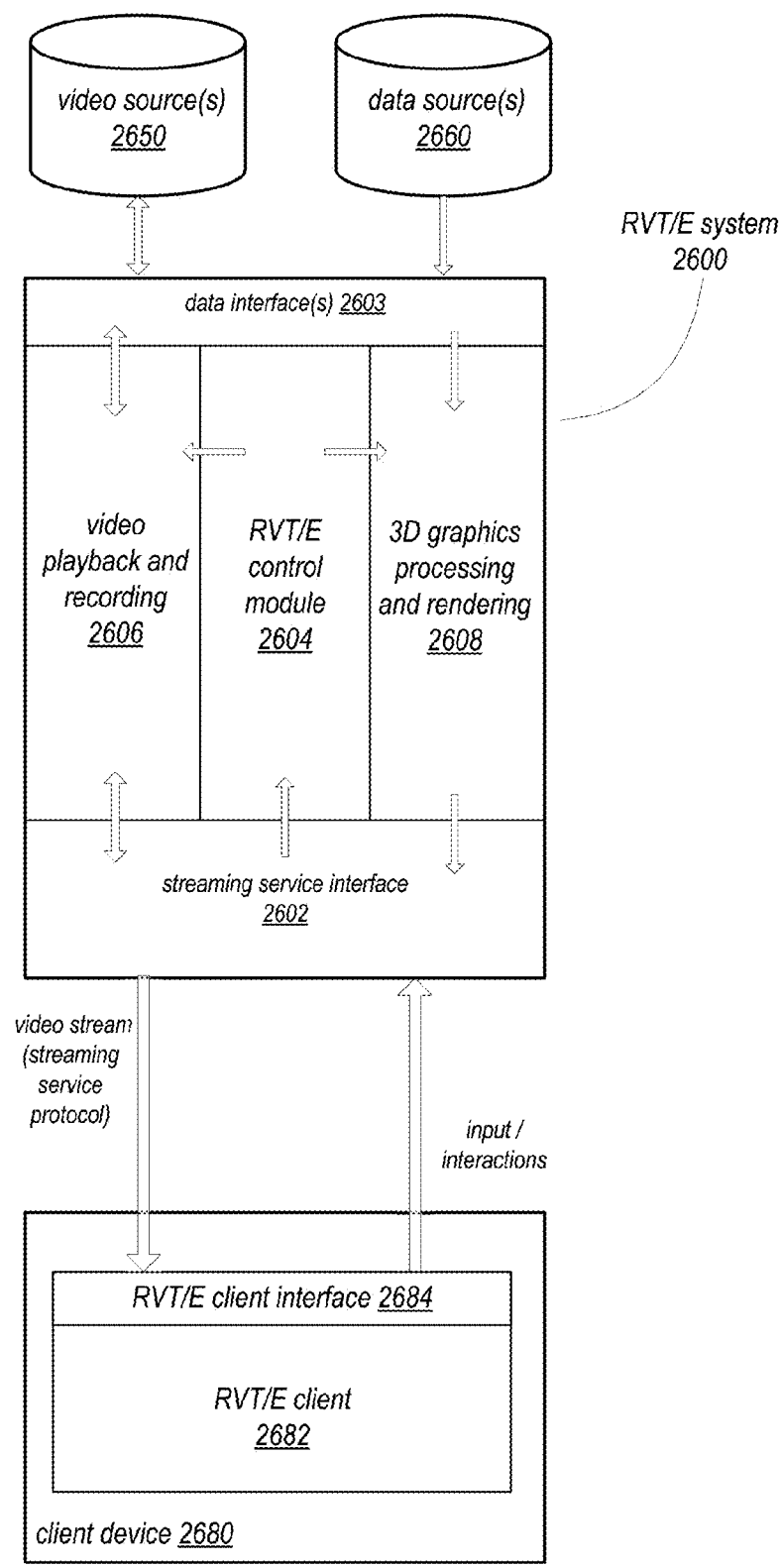
FIG. 13 illustrates an example network-based environment in which a streaming service is used to stream rendered video to clients, according to at least some embodiments.
Figure 14:
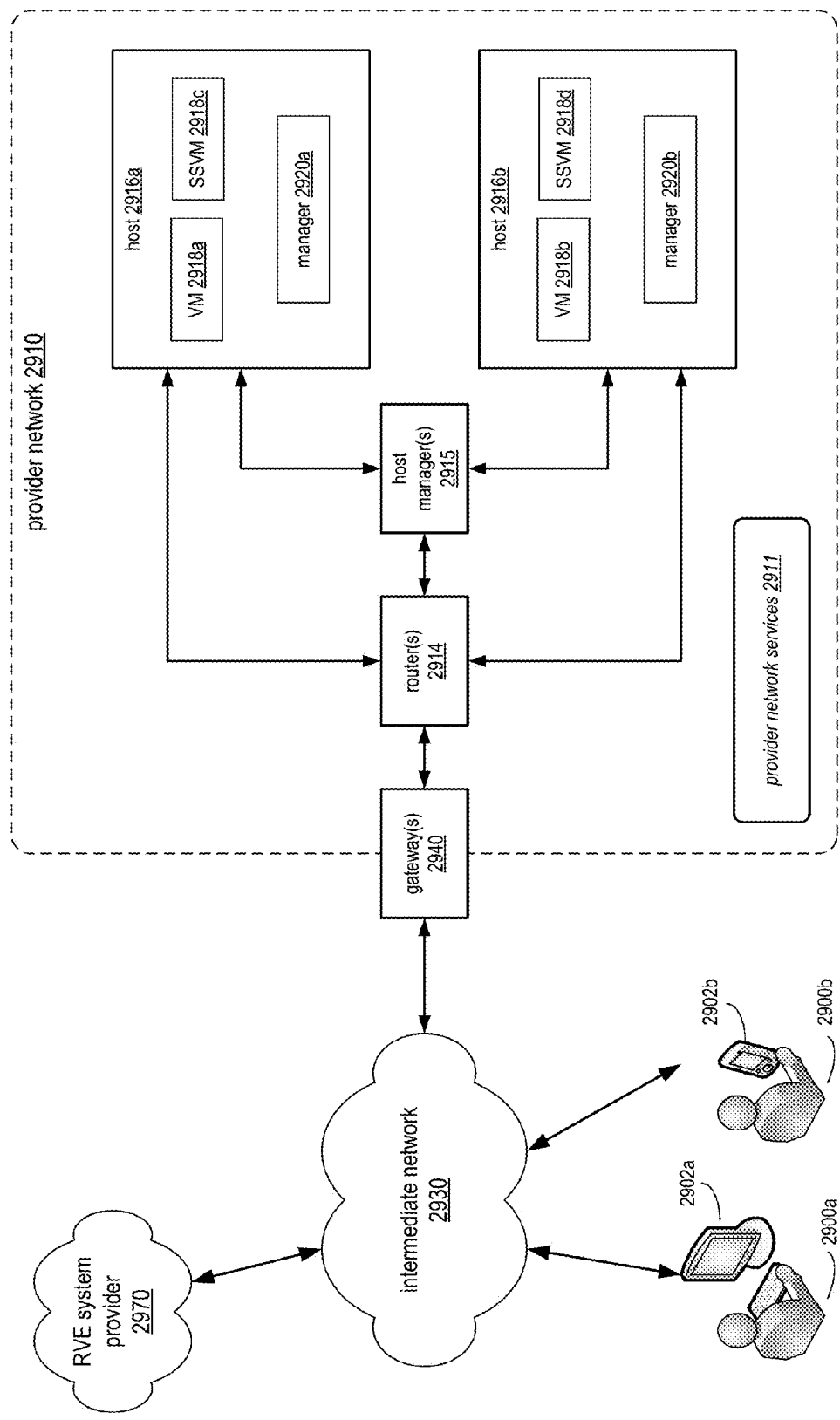
FIG. 14 is a diagram illustrating an example provider network environment in which embodiments as described herein may be implemented.
Figure 15:
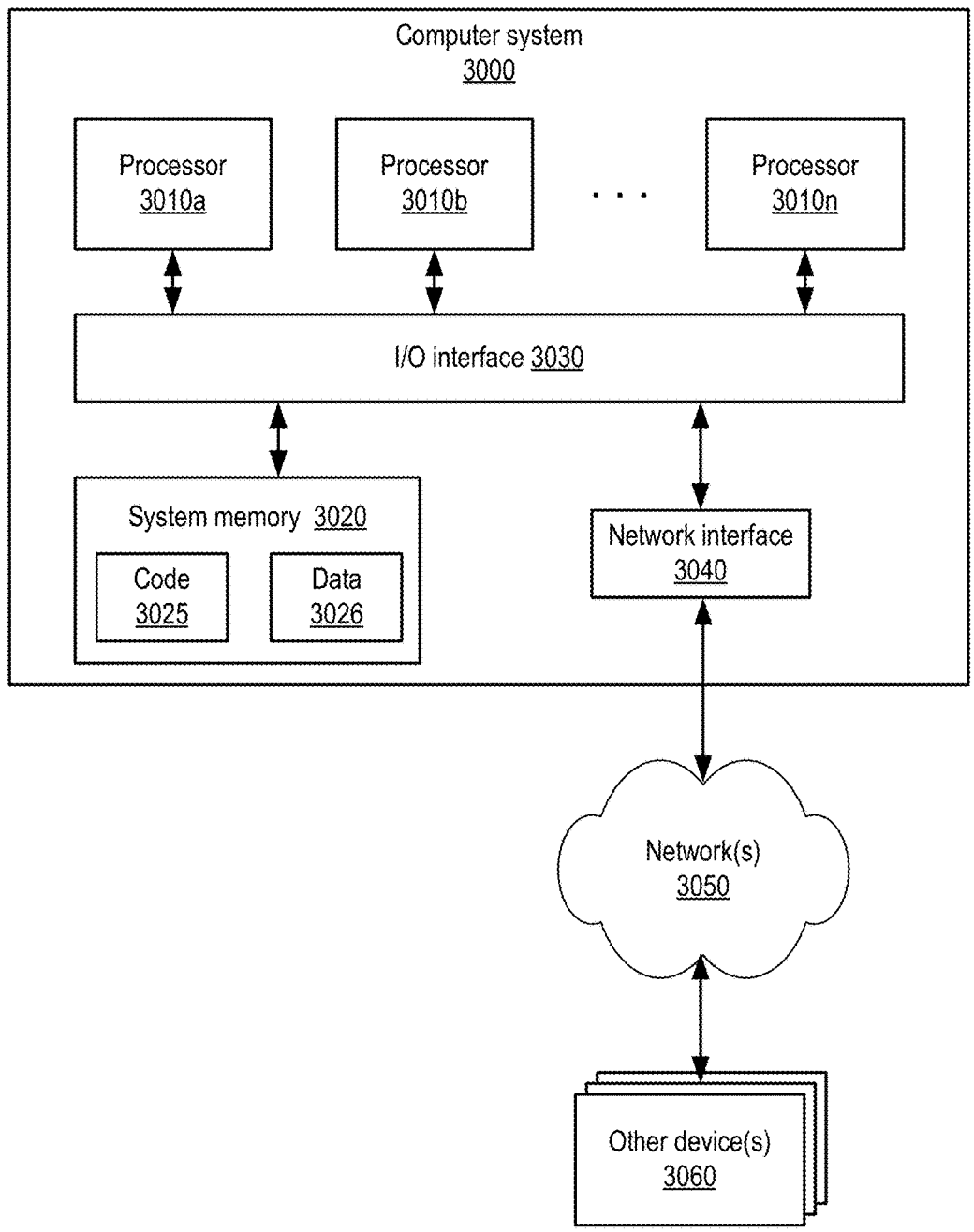
FIG. 15 is a block diagram illustrating an example computer system that may be used in some embodiments.

Since generating and rendering video content is computationally expensive, at least some embodiments of an RVT system may leverage network-based computation resources and services to dynamically generate or update 2D or 3D models from graphics data in response to particular viewer profiles or preferences, render new video content for the different viewers from the models, and deliver the newly rendered video content as video streams to respective client devices. The computational power available through the network-based computation resources allows the RVT system to dynamically provide personalized video content targeted at different viewers on different client devices in real time. FIG. 12 illustrates an example network environment in which network-based computation resources are leveraged to provide real-time, low-latency rendering and streaming of video content that may be used to implement an RVT system as described herein. FIG. 13 illustrates an example network-based environment in which a streaming service is used to stream rendered video to clients, according to at least some embodiments. FIG. 14 illustrates an example provider network environment in which embodiments of an RVT system as described herein may be implemented. FIG. 15 is a block diagram illustrating an example computer system that may be used in some embodiments.

In at least some embodiments, a given scene from a video being replayed may be dynamically rendered in real-time for a particular viewer or viewer group via the network-based computation resources and services, with a combination of two or more rendered objects and/or other content targeted at the viewer or viewer group according to a viewer profile, while the same scene may be dynamically rendered for other viewers with other combinations of two or more rendered objects and/or other content targeted at the other viewers according to their respective profiles. Thus, using embodiments, any given scene in a video being replayed can be dynamically modified in many different ways based on particular viewers' profiles.

While embodiments are generally described as generating 3D models of scenes and objects and rendering video from the 3D models of scenes and 3D objects using 3D graphics techniques, embodiments may also be applied in generating and rendering 2D models and objects for video using 2D graphics techniques.

Figure 3A:
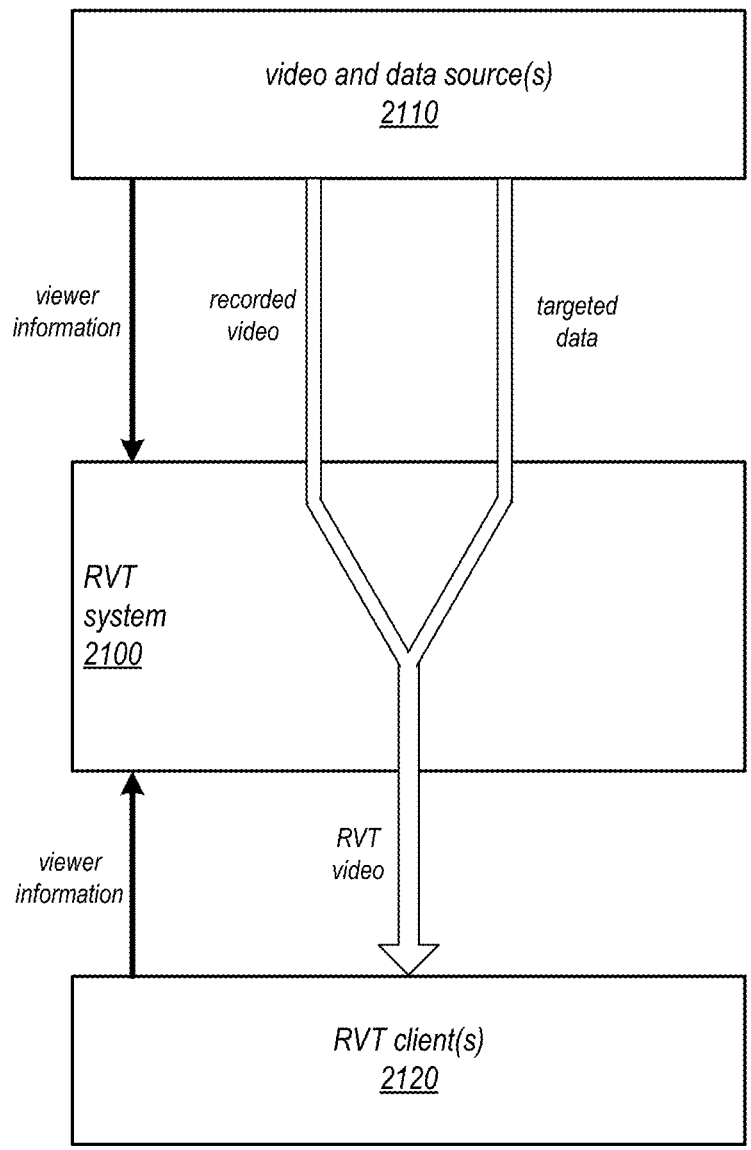
FIG. 3A is a high-level illustration of a real-time video targeting (RVT) system, according to at least some embodiments.

FIG. 1 is a high-level flowchart of a method for rendering and streaming targeted video content to viewers, according to at least some embodiments. FIG. 3A is a high-level illustration of a real-time video targeting (RVT) system in which the method of FIG. 1 may be implemented, according to at least some embodiments. As indicated at 2000 of FIG. 1, an RVT system 2100 may begin playback of a pre-recorded video from a source 2110 to at least one RVT client 2120. For example, the RVT system 2100 may begin playback of a pre-recorded video from a source 2110 to one or more client devices in response to user selection of the video for playback. As another example, the RVT system 2100 may begin playback of a pre-recorded video, for example according to a program schedule, and one or more users may choose to view the playback of the video via respective client devices.

As indicated at 2002 of FIG. 1, the RVT system 2100 may render targeted content for one or more scenes according to viewer profiles or preferences. In at least some embodiments, the one or more objects may be rendered at least in part using targeted data obtained from one or more sources 2110 according to the viewers' profiles or preferences. In at least some embodiments, information (e.g., preferences, viewing history, shopping history, sex, age, location, and other demographic and historical information) may be collected for or from users of the RVT system 2100, or may be accessed from other information sources 2110 or providers. This viewer information may be used to generate and maintain viewer profiles. The viewer profiles may be accessed according to identities of the viewer(s) when beginning replay of, or during the replay of, a video (e.g., a movie), and used to dynamically and differently render one or more objects in one or more scenes that are targeted at particular viewers or viewer groups according to their respective profiles.

As indicated at 2004 of FIG. 1, the RVT system 2100 may stream video including the targeted content to the respective client device(s). Thus, different viewers of the same video content (e.g., a movie) may be shown the same scenes with differently rendered, targeted objects injected into the scenes. The targeting of objects at particular viewers or viewer groups may, for example, be marketing- or advertising-based placement of particular products according to viewers' profiles, or may be tailoring or personalizing of video content based on the viewers' personal histories or preferences (e.g., this viewer buys sodas but not beer, so render sodas and not beer in a scene). Since the video is being rendered and streamed to different viewers in real-time by the network-based computation resources and services, any given scene of a video being streamed to the viewers or viewer groups may be modified and viewed in many different ways based on the particular viewers' profiles.

As a non-limiting example, one viewer may be shown an automobile of a particular make, model, color, or option package dynamically rendered in a scene of a pre-recorded video being played back according to the viewer's preferences, while another viewer may be shown an automobile of a different make, model, color, or option package when viewing the same scene. As another non-limiting example, one viewer or viewer group may be shown a particular brand or type of personal computing device, beverage, or other product in a scene based on the viewer's profile, while another viewer or viewer group may be shown a different brand or type of device or beverage.

In at least some embodiments, other content of scenes than targeted objects may also be dynamically rendered according to viewers' preferences and profiles. For example, background, color(s), lighting, global or simulated effects, or even audio in a scene may be rendered or generated differently for different viewers or viewer groups according to their respective profiles or preferences.

In at least some embodiments, scene content (including objects and other content such as background and effects) may be dynamically rendered differently for different viewers based upon other factors than object brand or type placement targeted at particular viewers or viewer groups according to the viewers' profiles. As an example, in some embodiments, a user may specify preferences for viewing graphic content or effects (e.g., blood spatter or other graphic effects) and one or more scenes may be dynamically rendered according to the user's preferences regarding graphic content, excluding or including graphic effects according to the user's preferences. As another example, in some embodiments, a user may specify preferences such as a favorite color or color palette, and portions of scenes (e.g., a color scheme of a room) or objects in scenes (e.g., an automobile) may be rendered according to the user's specified preferences.

Figure 2:
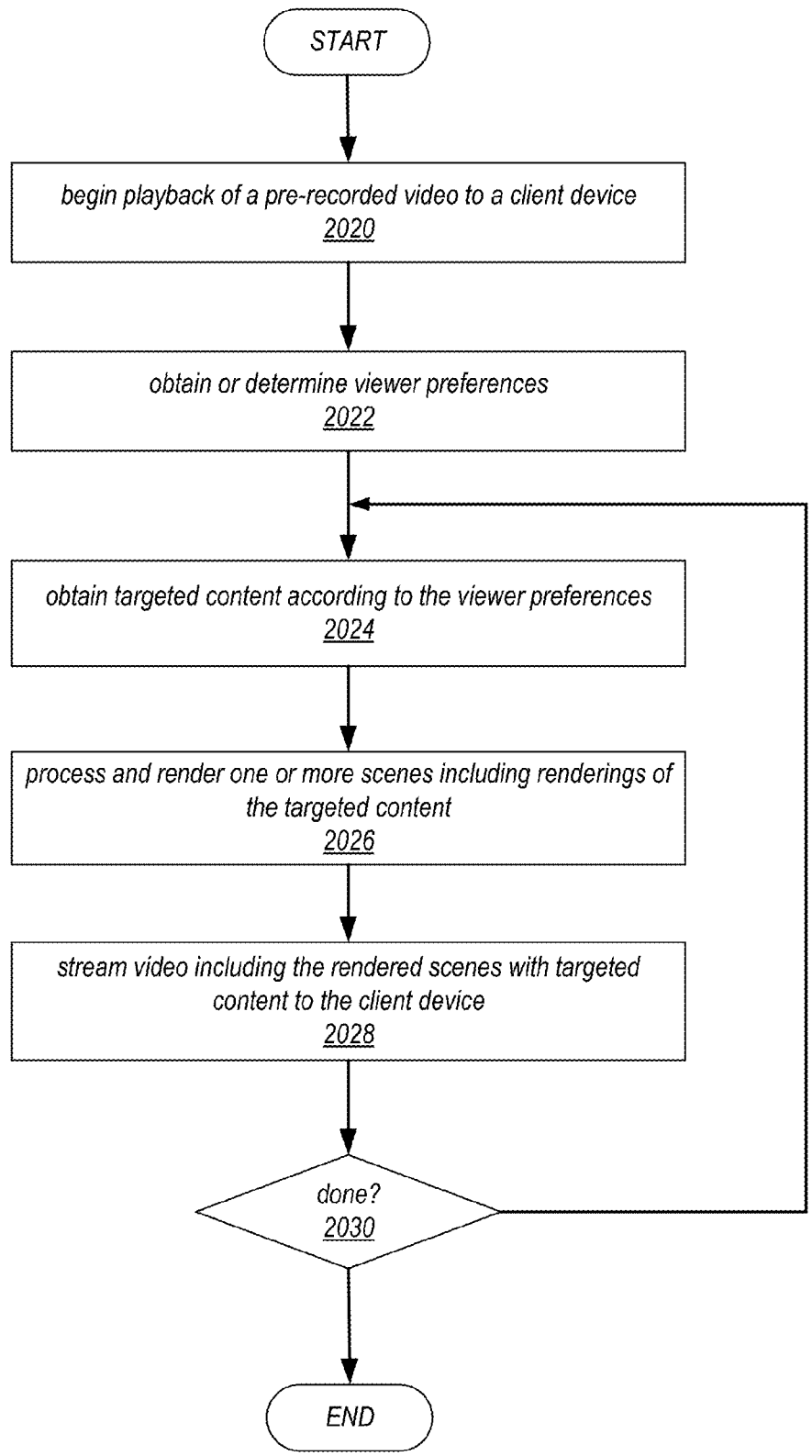
FIG. 2 is a flowchart of a method for rendering and streaming video content that is targeted to a particular viewer or viewer group, according to at least some embodiments.

FIG. 2 is a flowchart of a method for rendering and streaming video content that is targeted to a particular viewer, according to at least some embodiments. As indicated at 2020 of FIG. 2, and with reference to FIG. 3A, the RVT system 2100 may begin playback of a pre-recorded video from a source 2110 to a client 2120. For example, the RVT system 2100 may begin playback of a pre-recorded video from a video source 2110 to a client device in response to a respective user's selection of the video for playback. As another example, the RVT system 2100 may begin playback of a pre-recorded video, and the viewer may choose to view the playback of the video via the client device.

As indicated at 2022 of FIG. 2, the RVT system 2100 may obtain or determine viewer preferences for the viewer. In at least some embodiments, the RVT system 2100 may maintain viewer profiles for users of the system 2100, and may determine a particular viewer profile for this viewer according to an identity provided by the viewer and/or according to an identity determined from the client device to which the video is to be played back. In at least some embodiments, the viewer profile may indicate information (e.g., preferences, viewing history, shopping history, sex, age, location, and other demographic and historical information) specific to this viewer.

As indicated at 2024 of FIG. 2, the RVT system 2100 may obtain targeted content data from one or more sources 2110 according to the viewer preferences. The targeting of video content or objects at particular viewers may, for example, be marketing- or advertising-based placement of particular products according to viewers' profiles, or may be tailoring of video content based on the viewers' personal histories or preferences. In at least some embodiments, the RVT system 2100 may determine one or more objects or other content within a scene that may be targeted or personalized for this particular viewer, determine the viewer's preferences or other information from the viewer's profile, and use the information determined for this viewer to select and obtain particular 3D graphics data from one or more sources 2110 for rendering particular objects or other content targeted at or personalized for this viewer. For example, if this viewer buys sodas but not beer, the RVT system 2100 may obtain 3D graphics data to render sodas and not beer in a scene. As another example, if this viewer prefers one brand or model of automobile, the RVT system may obtain 3D graphics data to render the preferred brand or model of automobile. In at least some embodiments, the 3D graphics data may be obtained from a data store 2110 maintained by the RVT system 2100. However, in at least some embodiments, at least some of the 3D graphics data for targeting video content at viewers may be obtained from other, external data sources 2110, for example from manufacturer, vendor, dealer, or distributor websites.

As indicated at 2026 of FIG. 2, the RVT system 2100 may process and render one or more scenes including renderings of the targeted content using the obtained 3D graphics data. In at least some embodiments, the RVT system 2100 may leverage network-based computation resources and services to dynamically process and render one or more scenes including renderings of the targeted content. The computational power available through the network-based computation resources allows the RVT system 2100 to dynamically generate personalized video content targeted at the particular viewer for a particular video being played back, while also rendering different personalized video content for the same video for other viewers on different client devices. FIG. 12 illustrates an example network environment in which network-based computation resources are leveraged to provide real-time, low-latency rendering and streaming of video content that may be used to implement an RVT system 2100 as described herein.

As indicated at 2028 of FIG. 2, the RVT system 2100 may stream video including the scenes rendered with targeted and/or personalized content to the client device. In at least some embodiments, a streaming service may be leveraged to stream the video to the client device, as well as to other client device. FIG. 13 illustrates an example network-based environment in which a streaming service is used to stream rendered video to clients, according to at least some embodiments.

At 2030 of FIG. 2, if there is more video content to be played back, the method may return to element 2024. Otherwise, the method is done for this video.

Figure 3B:
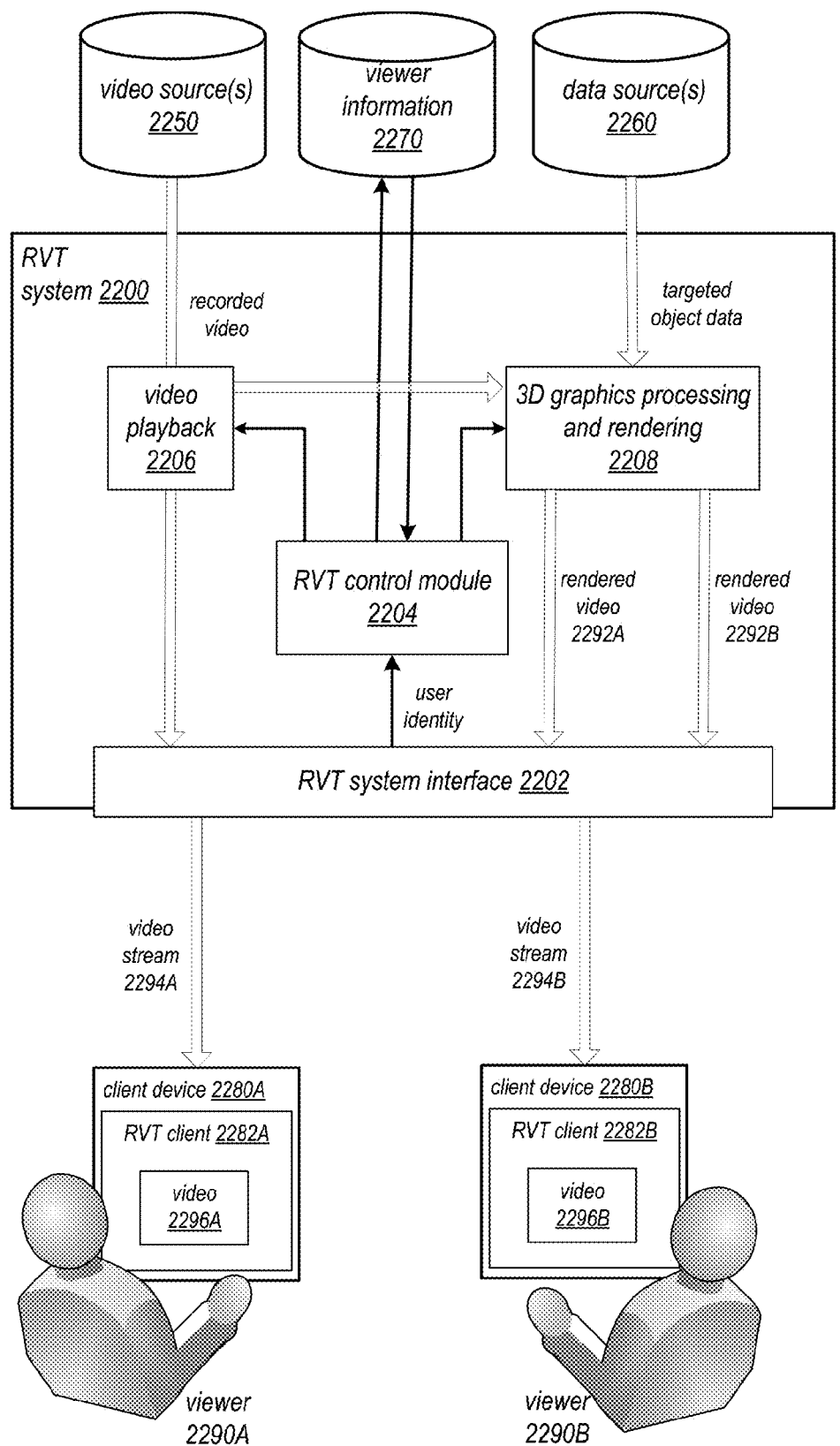
FIG. 3B illustrates an example real-time video targeting (RVT) system and environment in which at least some content of a pre-recorded video being played back to client devices is replaced with dynamically rendered content specifically targeted at viewers associated with the respective client devices, according to at least some embodiments.

FIG. 3B is a block diagram illustrating an example real-time video targeting (RVT) system 2200 in an RVT environment in which at least some content of a pre-recorded video being played back to client devices is replaced with dynamically rendered content specifically targeted at viewers associated with the respective client devices, according to at least some embodiments. RVT system 2200 may, for example, implement embodiments of the methods as illustrated in FIGS. 1 and 2. FIG. 12 illustrates an example network environment in which network-based computation resources may be leveraged to provide real-time, low-latency rendering and streaming of video content that may be used to implement an RVT system 2200. FIG. 14 illustrates an example provider network environment in which embodiments of an RVT system 2200 may be implemented. FIG. 15 is a block diagram illustrating an example computer system that may be used in embodiments of an RVT system 2200.

In at least some embodiments, an RVT environment as illustrated in FIG. 3B may include an RVT system 2200 and one or more client devices 2280. The RVT system 2200 has access to stores or other sources of pre-rendered, pre-recorded video, shown as video source(s) 2250. The video content may include one or more of, but is not limited to movies, shorts, cartoons, commercials, and television and cable programs. The video available from video source(s) 2250 may, for example, include fully 3D rendered, animated video content, as well as partially 3D rendered video content that involves filming live action using green- or blue-screen technology and adding background and/or other content or effects using one or more 3D computer graphics techniques.

Note that, in addition to sequences of video frames, a video may typically include other data such as audio tracks and video metadata. For example, in some embodiments, each frame may have or may correspond to a frame tag that includes information about the frame. The video metadata may include, but is not limited to, time stamps for frames and scene information. The scene information may include information about objects in the scene, for example object types, brands, manufacturers, and so one. In at least some embodiments, the video metadata may be accessed to determine objects in scenes that can be targeted at or personalized for particular viewers.

In at least some embodiments, the RVT system 2200 may also have access to stores or other sources of data and information including but not limited to 3D graphics data, shown as data source(s) 2260. The 3D graphics data may include data that was used in generating and rendering scenes for at least some of the pre-recorded video available from video sources 2250, and may also include additional 3D graphics data. Data source(s) 2260 may also store or otherwise provide other data and information including but not limited to data and information about viewers 2290. Non-limiting examples of user data that may be available from data source(s) 2260 include RVT system 2200 registration information, client device 2280 information, name, account number, contact information, billing information, and security information.

In at least some embodiments, the RVT system 2200 may also have access to stores or other sources of viewer information 2270. In at least some embodiments, information (e.g., preferences, viewing history, shopping history, sex, age, location, and other demographic and historical information) may be collected for or from users of the RVT system, or may be accessed from other information sources or providers. This viewer information may be used to generate and maintain viewer profiles for respective users or viewers; the viewer profiles may be stored as viewer information 2270. The viewer profiles may be accessed from viewer information 2270, for example according to identities of the viewer(s), when beginning replay of, or during the replay of, a video (e.g., a movie), and used to dynamically and differently render one or more objects or other video content in one or more scenes so that the scene(s) are targeted at particular viewers according to their respective profiles.

Note that, while video source(s) 2250, data source(s) 2260, and information sources 2270 are shown as separate sources in FIG. 3B, video, data, and/or information may be obtained from the same source or sources or from different sources.

In at least some embodiments, the RVT system 2200 may include a video playback 2206 module or component and an RVT system interface 2202. In at least some embodiments, RVT system interface 2292 may be or may include one or more application programming interfaces (APIs) for receiving input from and sending output to RVT client(s) 2282 on client device(s) 2280. In at least some embodiments, in response to viewer 2290 selection of a video for playback, the video playback 2206 module may obtain pre-rendered, pre-recorded video from a video source 2250, process the video as necessary, and stream the pre-recorded video to the respective client device 2280 via RVT system interface 2202. Alternatively, the RVT system 2200 may begin playback of a pre-recorded video, for example according to a program schedule, and one or more viewers 2290 may choose to view the playback of the video via respective client devices 2280.

In at least some embodiments, the RVT system 2200 may also include a 3D graphics processing and rendering 2208 module or component. Note that in some embodiments, 3D graphics processing and 3D rendering may be implemented as separate components or modules. For a given viewer 2290, 3D graphics processing and rendering 2208 module may obtain 3D data from one or more data sources 2260 according to the viewer's profile, generate a targeted 3D modeled world for the scene according to the 3D data, render 2D representations of the 3D modeled world, and stream the real-time rendered video to the respective client device 2280 via RVT system interface 2202.

In at least some embodiments, the RVT system 2200 may also include an RVT control module 2204 that may receive input from an RVT client 2282 on a respective client device 2280 via RVT system interface 2202, processes the input, and direct operations of video playback module 2206 and 3D graphics processing and rendering 2208 module accordingly. In at least some embodiments, the input and interactions may be received according to an API provided by RVT system interface 2202. In at least some embodiments, RVT control module 2204 may also retrieve viewer profile information from a viewer information 2270 source and direct 3D graphics processing and rendering 2208 module in rendering targeted content for the viewers 2290 according to the viewers' respective profiles and preferences.

In at least some embodiments, RVT system 2200 may be implemented by or on one or more computing devices, for example one or more server devices or host devices, that implement the modules or components 2202, 2204, 2206, and 2208, and may also include one or more other devices including but not limited to storage devices that store pre-recorded video, 3D graphics data, and/or other data and information that may be used by RVT system 2200. FIG. 15 illustrates an example computer system that may be used in some embodiments of an RVT system 2200. In at least some embodiments, the computing devices and storage devices may be implemented as network-based computation and storage resources, for example as illustrated in FIG. 12.

However, in some embodiments, functionality and components of RVT system 2200 may be implemented at least in part on one or more of the client devices 2280. For example, in some embodiments, at least some client devices 2280 may include a rendering component or module that may perform at least some rendering of video data streamed to the client devices 2280 from RVT system 2200. Further, in some embodiments, instead of an RVT system implemented according to a client-server model or variation thereof in which one or more devices such as servers host most or all of the functionality of the RVT system, an RVT system may be implemented according to a distributed or peer-to-peer architecture. For example, in a peer-to-peer architecture, at least some of the functionality and components of an RVT system 2200 as shown in FIG. 3B may be distributed among one, two, or more devices 2280 that collectively participate in a peer-to-peer relationship to implement and perform real-time video targeting methods as described herein.

While FIG. 3B shows two client devices 2280 and clients 2290 interacting with RVT system 2200, in at least some embodiments RVT system 2200 may support any number of client devices 2280. For example, in at least some embodiments, the RVT system 2200 may be a network-based video playback system that leverages network-based computation and storage resources to support tens, hundreds, thousands, or even more client devices 2280, with many videos being played back by different viewers 2290 via different client devices 2280 at the same time. In at least some embodiments, the RVT system 2200 may be implemented according to a service provider's provider network environment, for example as illustrated in FIGS. 12 and 14, that may implement one or more services that can be leveraged to dynamically and flexibly provide network-based computation and/or storage resources to support fluctuations in demand from the user base. In at least some embodiments, to support increased demand, additional computation and/or storage resources to implement additional instances of one or more of the modules of the RVT system 2200 (e.g., 3D graphics processing and rendering module 2208, video playback 2206 module, RVT control 2204 module, etc.) or other components not shown (e.g., load balancers, routers, etc.) may be allocated, configured, "spun up", and brought on line. When demand decreases, resources that are no longer needed can be "spun down" and deallocated. Thus, an entity that implements an RVT system 2200 on a service provider's provider network environment, for example as illustrated in FIGS. 12 and 14, may only have to pay for use of resources that are needed, and only when they are needed.

In at least some embodiments, an RVT client system may include a client device 2280 that implements an RVT client 2282. The RVT client 2282 may implement an RVT client interface (not shown) via which the RVT client 2282 may communicate with an RVT system interface 2202 of RVT system 2200, for example according to an API or APIs provided by RVT system interface 2202. The RVT client 2282 may receive video stream 2294 input from RVT system 2200 via RVT client interface 2284 and send the video 2296 to a display component of client device 2280 to be displayed for viewing. The RVT client 2282 may also receive input from the viewer 2290 and communicate at least some of the input to RVT system 2200 via the RVT client interface.

A client device 2280 may be any of a variety of devices (or combinations of devices) that can receive, process, and display video input according to an RVT client 2282 implementation on the device. A client device 2280 may include, but is not limited to, input and output components and software via which viewers 2290 can interface with the RVT system 2200 to play back targeted or personalized video that is rendered in real-time by the RVT system 2200 as described herein. A client device 2280 may implement an operating system (OS) platform that is compatible with the device 2280. The RVT client 2282 and RVT client interface on a particular client device 2280 may be tailored to support the configuration and capabilities of the particular device 2280 and the OS platform of the device 2280. Examples of client devices 2280 may include, but are not limited to, set-top boxes coupled to video monitors or televisions, cable boxes, desktop computer systems, laptop/notebook computer systems, pad/tablet devices, smartphone devices, game consoles, and handheld or wearable video viewing devices. Wearable devices may include, but are not limited to, glasses or goggles and "watches" or the like that are wearable on the wrist, arm, or elsewhere.

In addition to the ability to receive and display video input, a client device 2280 may include one or more integrated or external control devices and/or interfaces that may implement RVT controls (not shown). Examples of control devices that may be used include, but are not limited to, conventional cursor control devices such as keyboards and mice, touch-enabled display screens or pads, game controllers, remote control units or "remotes" such as those that commonly come with consumer devices, and "universal" remote control devices that can be programmed to operate with different consumer devices. In addition, some implementations may include voice-activated interface and control technology.

Note that, in FIGS. 1 through 3B and elsewhere in this document, the terms "user", "viewer", or "consumer" are generally used to refer to an actual human that participates in an RVT system environment via a client device to play back targeted or personalized video as described herein, while the term "client" (as in "client device" and "RVT client") is generally used to refer to a hardware and/or software interface via which the user or viewer interacts with the RVT system to play back targeted or personalized videos as described herein.

As an example of operations of an RVT system 2200 as illustrated in FIG. 3B, RVT control module 2204 may direct video playback module 2206 to begin playback of a video or portion thereof from a video source 2250 to one or more client devices 2280, for example in response to input received from a client device 2280 or according to a program schedule. During playback of the video to the client devices 2280, RVT control module 2204 may determine viewers 2290, access the viewers' profiles and preferences from viewer information 2270, and direct 3D graphics processing and rendering 2208 module to target particular content (e.g., particular objects) to particular viewers of the video being played back (e.g., viewers 2290A and 2290B) according to the viewers' profiles and preferences accessed from viewer information 2270. In response, the 3D graphics processing and rendering 2208 module may obtain targeted object data from data source(s) 2260 for one or more objects in a scene as well as 3D data for rendering the scene, generate 3D models of the objects according to the respective targeted object data, and render 2D representations of the scenes that include the targeted objects injected into the scenes or replacing objects in the original scene to generate rendered videos 2292A and 2292B targeted at viewers 2290A and 2290B, respectively. RVT system interface 2202 may stream the real-time rendered videos 2294A and 2294B to the respective client devices 2280A and 2280B. While not shown, in some embodiments, preferences and/or profiles may be maintained for viewer groups such as families or roommates, and module 2208 may obtain targeted object data to generate rendered video targeted at particular viewer groups according to the groups' preferences and/or profiles.

Note that, while FIG. 3B shows two client devices 2280 and two viewers 2290, the RVT system 2200 may be used to generate and render targeted video content to tens, hundreds, thousands, or more client devices 2280 and viewers 2290 simultaneously. In at least some embodiments, the RVT system 2200 may leverage network-based computation resources and services (e.g., a streaming service) to determine viewer profiles and preferences, responsively obtain 3D data and generate or update targeted 3D models from the 3D data according to the viewer profiles or preferences, render new, targeted video content 2292 of the scene from the 3D models, and deliver the newly rendered, targeted video content to multiple client devices 2280 in real-time or near-real-time as targeted video streams 2294. The computational power available through the network-based computation resources, as well as the video streaming capabilities provided through a streaming protocol, allows the RVT system to dynamically provide personalized video content to many different viewers on many different client devices in real time.

Figure 4A:
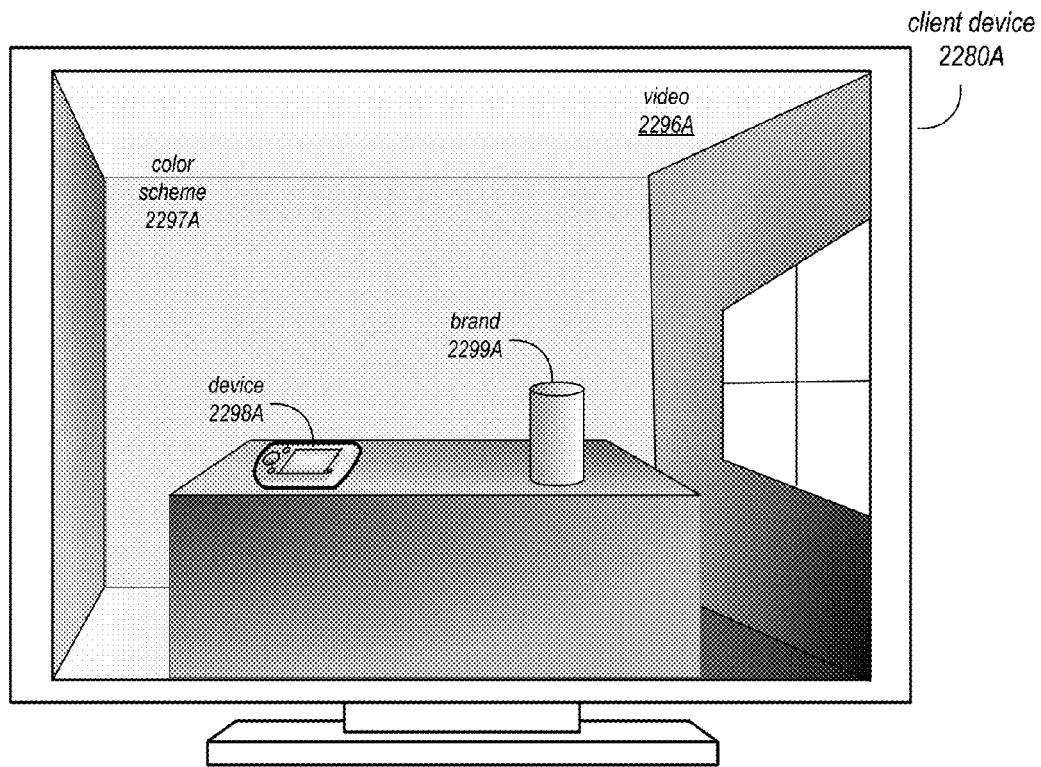
FIGS. 4A and 4B graphically illustrate rendered video content that is specifically targeted to particular viewers or viewer groups, according to at least some embodiments of an RVT system.
Figure 4B:
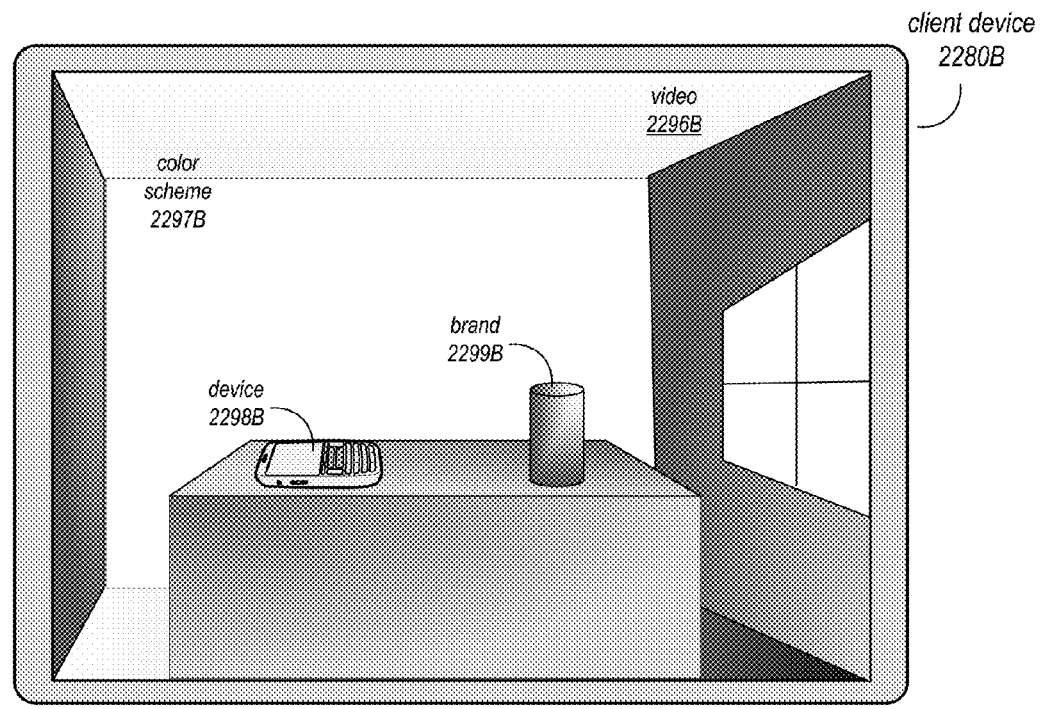

FIGS. 4A and 4B graphically illustrate examples of rendered video content that is specifically targeted to particular viewers or viewer groups, according to at least some embodiments. Using FIG. 3B as an example, viewer 2290A may view the targeted video 2296A on client device 2280A, while viewer 2290B may view the targeted video 2296B on client device 2280B. Targeted video 2290A may show a beverage can of brand 2299A, and a personal computing device of type 2298A, as determined according to the profile of viewer 2290A. Targeted video 2290B may show a beverage can of brand 2299B, and a personal computing device of type 2298B, as determined according to the profile of viewer 2290B. In addition, the current scene may be shown to viewer 2290A according to a first color scheme 2297A according to viewer 2290A's preferences, while the same scene may be shown to viewer 2290B according to a second color scheme 2297B according to viewer 2290B's preferences.

The following section describes embodiments of a real-time video exploration (RVE) system and method. At least some embodiments of an RVT system as described above may also implement one or more of the RVE methods as described below, or may be integrated with a real-time video explorer (RVE) system as described below. The RVE methods may, for example, be used, for example, to pause, step into, explore, and manipulate content of the personalized or targeted video generated according to the RVT methods. Similarly, the RVT methods may, for example, be used to generate targeted video content as input to the RVE system. A system that implements RVT and/or RVE methods may be referred to as an RVT/E system.

Real-Time Video Exploration (RVE) System and Methods

Various embodiments of methods and apparatus for generating, presenting, and exploring three-dimensional (3D) modeled worlds from within pre-rendered video are described. Video, including but not limited to movies, may be produced using 3D computer graphics techniques to generate 3D modeled worlds for scenes and render two-dimensional (2D) representations of the 3D modeled worlds from selected camera viewpoints as output. In 3D video production, scene content (e.g., 3D objects, textures, colors, backgrounds, etc.) is determined for each scene, a camera viewpoint or perspective is pre-selected for each scene, the scenes (each representing a 3D world) are generated and rendered according to 3D computer graphics techniques, and the final rendered output video (e.g., a movie) includes a 2D representation of the 3D worlds, with each frame of each scene rendered and shown from a fixed, pre-selected camera viewpoint and angle, and with fixed, predetermined content. Thus, conventionally, a consumer of pre-rendered video (e.g., a movie) views the scenes in the movie from pre-selected camera viewpoints and angles, and with pre-determined content.

The 3D graphics data used in generating videos (e.g., movies) includes rich 3D content that is not presented to the viewer in conventional video, as the viewer views the scenes in the video rendered from perspectives that were pre-selected by the director, and all viewers of the video view the scenes from the same perspectives. However, the 3D graphics data may be available or may be made available, and if not available at least some 3D data may be generated from the original video, for example using various 2D-to-3D modeling techniques.

Figure 5A:
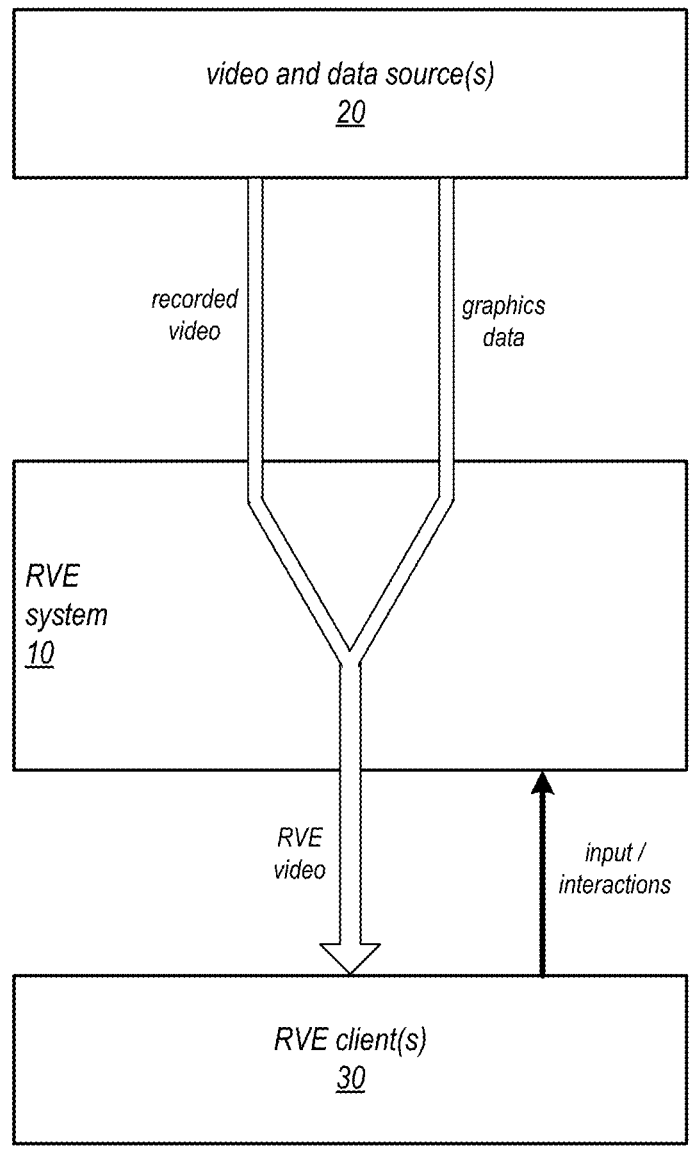
FIG. 5A is a high-level illustration of a real-time video exploration (RVE) system, according to at least some embodiments.

Embodiments of real-time video exploration (RVE) methods and systems are described that may leverage this 3D graphics data to enable interactive exploration of 3D modeled worlds from scenes in pre-rendered, pre-recorded video by generating and rendering new video content in real time at least in part from the 3D graphics data. FIG. 5A is a high-level illustration of a real-time video exploration (RVE) system 10, according to at least some embodiments. Embodiments of an RVE system 10 may, for example, allow a video consumer (also referred to herein as a user or viewer), via an RVE client 30, to "step into" a scene in a video (e.g., a movie) to explore the rest of the 3D modeled world "behind the scenes" via a user-controlled, free-roaming "camera" that allows the user to change viewing positions and angles in the 3D modeled world.

In at least some embodiments, the RVE system 10 may play back video from one or more sources 20 to one or more RVE clients 30, receive user input/interactions within scenes being explored from respective RVE clients 30, responsively generate or update 3D models from graphics data obtained from one or more sources 20 in response to the user input/interactions exploring the scenes, render new video content of the scenes at least in part from the 3D models, and deliver the newly rendered video content (and audio, if present) to the respective RVE clients 30 as RVE video. Thus, rather than just viewing a pre-rendered scene in a movie from a perspective that was pre-selected by a director, a user may step into and explore the scene from different angles, wander around the scene at will within the scope of the 3D modeled world, and discover hidden objects and/or parts of the scene that are not visible in the original video as recorded. The RVE video that is output to the client(s) 30 by RVE system 10 is a video stream that has been processed and rendered according to two inputs, one input being the user's exploratory inputs, the second input being the recorded video and/or graphics data obtained from source(s) 20. In at least some embodiments, RVE system 10 may provide one or more application programming interfaces (APIs) for receiving input from and sending output to RVE client(s) 30.

Since exploring and rendering a 3D world is computationally expensive, at least some embodiments of an RVE system 10 may leverage network-based computation resources and services (e.g., a streaming service) to receive user input/interactions within a scene being explored from an RVE client 30 on a client device, responsively generate or update a 3D model from the 3D data in response to the user input/interactions, render new video content of the scene from the 3D model, and deliver the newly rendered video content (and in some cases also audio) as a video stream to the client device in real-time or near-real-time and with low latency. The computational power available through the network-based computation resources, as well as the video and audio streaming capabilities provided through a streaming protocol, allows the RVE system 10 to provide low-latency responses to the user's interactions with the 3D world as viewed on the respective client device, thus providing a responsive and interactive exploratory experience to the user. FIG. 12 illustrates an example RVE system and environment in which network-based computation resources are leveraged to provide real-time, low-latency rendering and streaming of video content, according to at least some embodiments. FIG. 13 illustrates an example network-based environment in which a streaming service is used to stream rendered video to clients, according to at least some embodiments. FIG. 14 illustrates an example provider network environment in which embodiments of an RVE system as described herein may be implemented. FIG. 15 is a block diagram illustrating an example computer system that may be used in some embodiments.

In addition to allowing users to pause, step into, move through, and explore the 3D modeled worlds of scenes in a video, at least some embodiments of an RVE system 10 may also allow users to modify the scenes, for example by adding, removing, or modifying various graphics effects such as lens effects (e.g., fisheye, zoom, filter, etc.), lighting effects (e.g., illumination, reflection, shadows, etc.), color effects (color palette, color saturation, etc.), or various simulated effects (e.g., rain, fire, smoke, dust, fog, etc.) to the scenes.

In addition to allowing users to pause, step into, move through, explore, and even modify the 3D modeled worlds of scenes in a video, at least some embodiments of an RVE system 10 may also allow users to discover, select, explore, and manipulate objects within the 3D modeled worlds used to generate video content. At least some embodiments of an RVE system 10 may implement methods that allow users to view and explore in more detail the features, components, and/or accessories of selected objects that are being manipulated and explored. At least some embodiments of an RVE system 10 may implement methods that allow users to interact with interfaces of selected objects or interfaces of components of selected objects.

In addition to allowing users to explore scenes and manipulate objects within scenes, at least some embodiments of an RVE system 10 may allow users to interact with selected objects to customize or accessorize the objects. For example, a viewer can manipulate or interact with a selected object to add or remove accessories, customize the object (change color, texture, etc.), or otherwise modify the object according to the user's preferences or desires. In at least some embodiments, the RVE system 10 may provide an interface via which the user can obtain additional information for the object, customize and/or accessorize an object if and as desired, be given a price or price(s) for the object as customized/accessorized, and order or purchase the object as specified if desired.

At least some embodiments of an RVE system 10 may allow a user to create and record their own customized version of a video such as a movie, and/or to stream or broadcast a customized version of a video to one or more destinations in real time. Using embodiments, new versions of videos or portions of videos may be generated and may, for example, be stored or recorded to local or remote storage, shown to or shared with friends, or may be otherwise recorded, stored, shared, streamed, broadcast, or distributed assuming the acquisition of appropriate rights and permissions to share, distribute, or broadcast the new video content.

At least some embodiments of an RVE system 10 may leverage network-based computation resources and services to allow multiple users to simultaneously receive, explore, manipulate, and/or customize a pre-recorded video via clients 30. The RVE system 10 may, for example, broadcast a video stream to multiple clients 30, and users corresponding to the clients 30 may each explore, manipulate, and/or customize the video as desired. Thus, at any given time, two or more users may be simultaneously exploring a given scene of a video being played back in real time, or may be simultaneously watching the scene from different perspectives or with different customizations, with the RVE system 10 interactively generating, rendering, and streaming new video to clients 30 corresponding to the users according to the users' particular interactions with the video. Note that the video being played back to the clients 30 may be pre-recorded video or may be new video generated by a user via one of the clients 30 and broadcast "live" to one or more others of the clients 30 via the RVE system 10.

While embodiments of the RVE system 10 are generally described as generating 3D models of scenes and objects and rendering video from the 3D models of scenes and 3D objects using 3D graphics techniques, embodiments may also be applied in generating and rendering 2D models and objects for video using 2D graphics techniques.

At least some embodiments of an RVE system may implement real-time video targeting (RVT) methods as described herein, or may be integrated with a real-time video targeting (RVT) system as described herein. The RVE methods may be used, for example, to pause, step into, explore, and manipulate content of the personalized or targeted video generated according to the RVT methods. A system that implements RVT and/or RVE methods may be referred to as an RVT/E system.

Figure 5B:
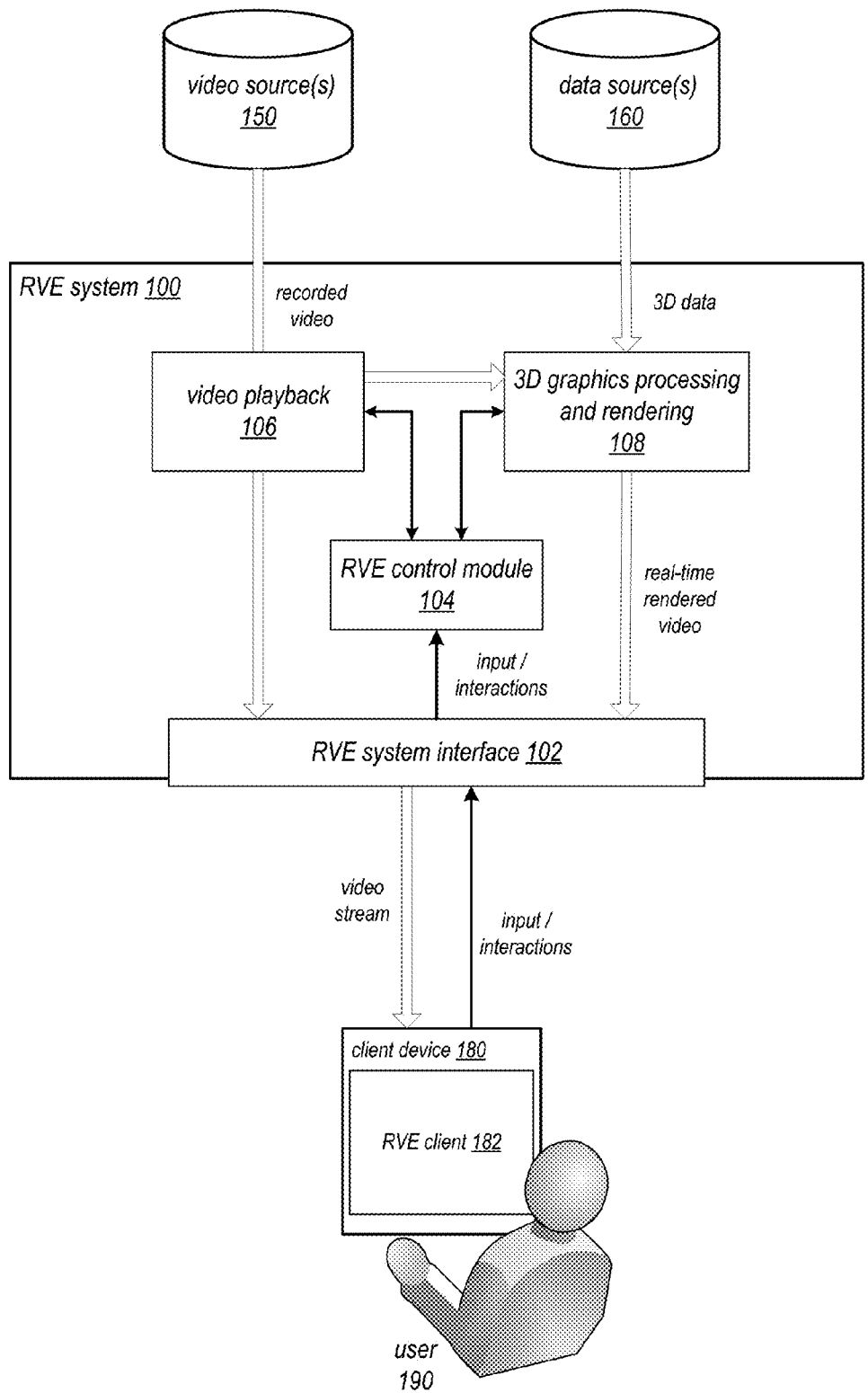
FIG. 5B illustrates an example real-time video exploration (RVE) system and environment in which users can explore modeled worlds rendered in real-time during playback of pre-recorded video, according to at least some embodiments.

FIG. 5B illustrates an example real-time video exploration (RVE) system 100 in an RVE in which users can explore 3D modeled worlds rendered in real-time during playback of pre-recorded video, according to at least some embodiments. In at least some embodiments, an RVE environment as illustrated in FIG. 5B may include an RVE system 100 and one or more client devices 180. The RVE system 100 has access to stores or other sources of pre-rendered, pre-recorded video, shown as video source(s) 150. The video content may include one or more of, but is not limited to movies, shorts, cartoons, commercials, and television and cable programs. The video available from video source(s) 150 may, for example, include fully 3D rendered, animated video content, as well as partially 3D rendered video content that involves filming live action using green- or blue-screen technology and adding background and/or other content or effects using one or more 3D computer graphics techniques.

Note that, in addition to sequences of video frames, a video may typically include other data such as audio tracks and video metadata. For example, in some embodiments, each frame may have or may correspond to a frame tag that includes information about the frame. The video metadata may include, but is not limited to, time stamps for frames and scene information.

In at least some embodiments, the RVE system 100 may also have access to stores or other sources of data and information including but not limited to 3D graphics data, shown as data source(s) 160. The 3D graphics data may include data that was used in generating and rendering scenes for at least some of the pre-recorded video available from video sources 150, and may also include additional 3D graphics data. Data source(s) 160 may also store or otherwise provide other data and information including but not limited to data and information about particular users 190. Non-limiting examples of user data that may be available from data source(s) 160 include RVE system 100 registration information, client device 180 information, name, account number, contact information, billing information, and security information. In some embodiments, data source (s) 160 may also store or otherwise provide information for users including preferences, viewing history, shopping history, sex, age, location, and other demographic and historical information. Note that, while video source(s) 150 and data source(s) 160 are shown as separate sources in FIG. 5B, video and data may be obtained from the same source or sources or from different sources.

In at least some embodiments, the RVE system 100 may include a video playback 106 module or component and an RVE system interface 102. In at least some embodiments, RVE system interface 102 may be or may include one or more application programming interfaces (APIs) for receiving input from and sending output to RVE client(s) 182 on client device(s) 180. In at least some embodiments, in response to user 190 selection of a video for playback, the video playback 106 module may obtain pre-rendered, pre-recorded video from a video source 150, process the video as necessary, and stream the pre-recorded video to the respective client device 180 via RVE system interface 102. Alternatively, the RVE system 100 may begin playback of a pre-recorded video, for example according to a program schedule, and one or more users 190 may choose to view the playback of the video via respective client devices 180.

In at least some embodiments, the RVE system 100 may also include a 3D graphics processing and rendering 108 module or component. Note that in some embodiments, 3D graphics processing and 3D rendering may be implemented as separate components or modules. During an RVE event in which the user 190 pauses a video being played back and steps into a scene, 3D graphics processing and rendering 108 module may obtain 3D data from one or more data sources 160, generate a 3D modeled world for the scene according to the 3D data, render 2D representations of the 3D modeled world from user-controlled camera viewpoints, and stream the real-time rendered video to the respective client device 180 via RVE system interface 102.

In at least some embodiments, the RVE system 100 may also include an RVE control module 104 that receives input and interactions from an RVE client 182 on a respective client device 180 via RVE system interface 102, processes the input and interactions, and directs operations of video playback module 106 and 3D graphics processing and rendering 108 module accordingly. In at least some embodiments, the input and interactions may be received according to an API provided by RVE system interface 102. RVE control module 104 may also track operations of video playback module 106 and 3D graphics processing and rendering 108 module. For example, RVE control module 104 may track playback of a given video through video playback 106 module so that the RVE control module 104 can determine which scene is currently being played back to a given client device 180.

In at least some embodiments, RVE system 100 may be implemented by or on one or more computing devices, for example one or more server devices or host devices, that implement the modules or components 102, 104, 106, and 108, and may also include one or more other devices including but not limited to storage devices that store pre-recorded video, 3D graphics data, and/or other data and information that may be used by RVE system 100. FIG. 15 illustrates an example computer system that may be used in some embodiments of an RVE system 100. In some embodiments, the computing devices and storage devices may be implemented as network-based computation and storage resources, for example as illustrated in FIG. 12.

However, in some embodiments, functionality and components of RVE system 100 may be implemented at least in part on one or more of the client devices 180. For example, in some embodiments, at least some client devices 180 may include a rendering component or module that may perform at least some rendering of video data streamed to the client devices 180 from RVE system 100. Further, in some embodiments, instead of an RVE system implemented according to a client-server model or variation thereof in which one or more devices such as servers host most or all of the functionality of the RVE system, an RVE system may be implemented according to a distributed or peer-to-peer architecture. For example, in a peer-to-peer architecture, at least some of the functionality and components of an RVE system 100 as shown in FIG. 5B may be distributed among one, two, or more devices 180 that collectively participate in a peer-to-peer relationship to implement and perform real-time video exploration methods as described herein.

While FIG. 5B shows a single client device 180 and client 190 interacting with RVE system 100, in at least some embodiments RVE system 100 may support many client devices 180. For example, in at least some embodiments, the RVE system 100 may be a network-based video playback and exploration system that leverages network-based computation and storage resources to support tens, hundreds, thousands, or even more client devices 180, with many videos being played back and/or explored by different users 190 via different client devices 180 at the same time. In at least some embodiments, the RVE system 100 may be implemented according to a service provider's provider network environment, for example as illustrated in FIGS. 12 and 14, that may implement one or more services that can be leveraged to dynamically and flexibly provide network-based computation and/or storage resources to support fluctuations in demand from the user base. In at least some embodiments, to support increased demand, additional computation and/or storage resources to implement additional instances of one or more of the modules of the RVE system 100 (e.g., 3D graphics processing and rendering module 108, video playback 106 module, RVE control 104 module, etc.) or other components not shown (e.g., load balancers, routers, etc.) may be allocated, configured, "spun up", and brought on line. When demand decreases, resources that are no longer needed can be "spun down" and deallocated. Thus, an entity that implements an RVE system 100 on a service provider's provider network environment, for example as illustrated in FIGS. 12 and 14, may only have to pay for use of resources that are needed, and only when they are needed.

Figure 5C:
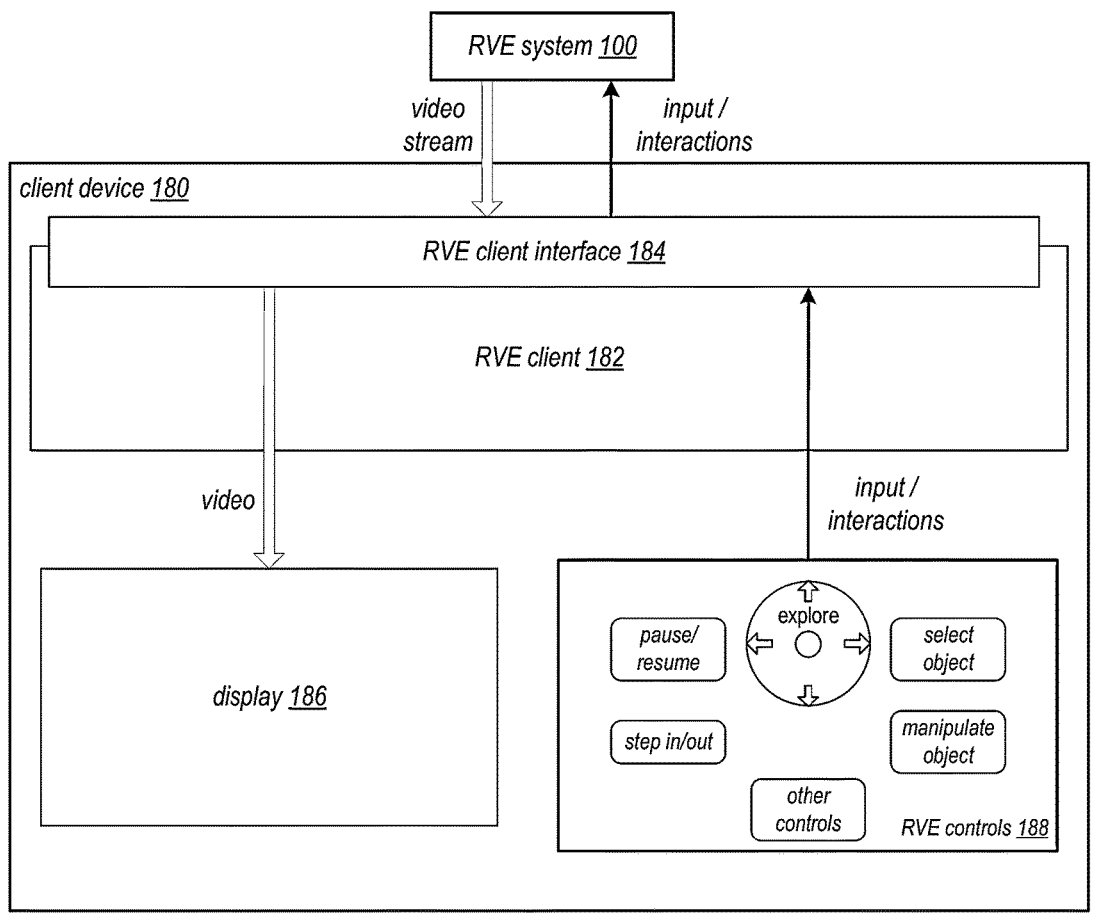
FIG. 5C illustrates an example RVE client system, according to at least some embodiments.

FIG. 5C illustrates an example RVE client system, according to at least some embodiments. An RVE client system may include a client device 180 that implements an RVE client 182. The RVE client 182 may implement an RVE client interface 184 via which the RVE client 182 on device may communicate with an RVE system interface 102 of RVE system 100, for example according to an API or APIs provided by RVE system interface 102. The RVE client 182 may receive video stream input from RVE system 100 via RVE client interface 184 and send the video to a display 186 component of client device 180 to be displayed for viewing. The RVE client 182 may receive input/interactions from an RVE controls 188 component and communicate at least some of the input/interactions to RVE system 100 via RVE client interface 184.

A client device 180 may be any of a variety of devices (or combinations of devices) that can receive, process, and display video input according to an RVE client 182 implementation on the device. A client device 180 may include, but is not limited to, input and output components and software (RVE client 182 and interface 184) via which users 190 can interface with the RVE system 100 to play back video and to explore scenes in the video in real-time as described herein. A client device 180 may implement an operating system (OS) platform that is compatible with the device 180. The RVE client 182 and interface 184 on a particular client device 180 may be tailored to support the configuration and capabilities of the particular device 180 and the OS platform of the device 180. Examples of client devices 180 may include, but are not limited to, set-top boxes coupled to video monitors or televisions, cable boxes, desktop computer systems, laptop/notebook computer systems, pad/tablet devices, smartphone devices, game consoles, and handheld or wearable video viewing devices. Wearable devices may include, but are not limited to, glasses or goggles and "watches" or the like that are wearable on the wrist, arm, or elsewhere. An example computing device that may be used as a client device 180 is illustrated in FIG. 15. A non-limiting example of an RVE client device 180 is graphically illustrated in FIG. 11.

In addition to the ability to receive and display video input, a client device 180 may include one or more integrated or external control devices and/or interfaces that may implement RVE controls 188. Examples of control devices that may be used include, but are not limited to, conventional cursor control devices such as keyboards and mice, touch-enabled display screens or pads, game controllers, remote control units or "remotes" such as those that commonly come with consumer devices, and "universal" remote control devices that can be programmed to operate with different consumer devices. In addition, some implementations may include voice-activated interface and control technology. Example RVE control interfaces may include, but are not limited to, control bars or control windows that may be shown/hidden at the bottom of (or elsewhere on) a video display, and that may be interacted with via touch devices, cursor control devices, or remote control devices. Note, however, that in some implementations touch gesture input to a video displayed on a touch-enabled device may be used as RVE controls. Example RVE controls 188 that may be implemented on or by a control device and/or control interface may include one or more of, but are not limited to: pause/resume control(s) for pausing and resuming video playback; step in/out control(s) for stepping into or out of a particular scene; "explore" controls for moving the user's viewpoint or "camera" around (e.g., backwards, forwards, up, down, left right) in a scene, changing the angle of the user's viewpoint, and so on; one or more controls for selecting objects in the scene, and for manipulating objects in the scene in one or more ways; and in general any other controls that may be used in controlling video playback and exploring, interacting with, and manipulating video content including objects in a scene.

As an example of operations of an RVE system 100 as illustrated in FIGS. 5B and 5C, RVE control module 104 may direct video playback module 106 to begin playback of a selected video or portion thereof from a video source 150 to a respective client device 180 in response to input received from the client device 180. During playback of the video to the client device 180, additional input and interactions received by RVE control module 104 from the RVE client 182 on the client device 180 may indicate an RVE event in which the user 190 pauses the video being played back to the client device 180 and steps into a scene. In response, the RVE control module 104 may direct video playback 106 module to pause playback of the pre-recorded video from video source(s) 150, and direct 3D graphics processing and rendering 108 module to begin generating a 3D modeled world for the scene according to 3D data for the scene obtained from data source(s) 160, rendering a 2D representations of the 3D modeled world, and streaming the real-time rendered video to the respective client device 180. In response to additional user input and interactions received from RVE client 182 indicating that the user is exploring the scene, the RVE control module 104 may direct 3D graphics processing and rendering 108 module to render and stream new video of the scene from the 3D modeled world according to the 3D data for the scene and current user input, for example new video rendered from a particular position and angle within the 3D modeled world of the scene that is indicated by the user's current input to RVE client 182. In response to resume input received from RVE client 182, the RVE control module 104 may direct 3D graphics processing and rendering 108 module to stop generating and streaming new exploratory video of the scene, and direct video playback 106 module to resume playback of the pre-recorded video from video source(s) 150.

Figure 6:
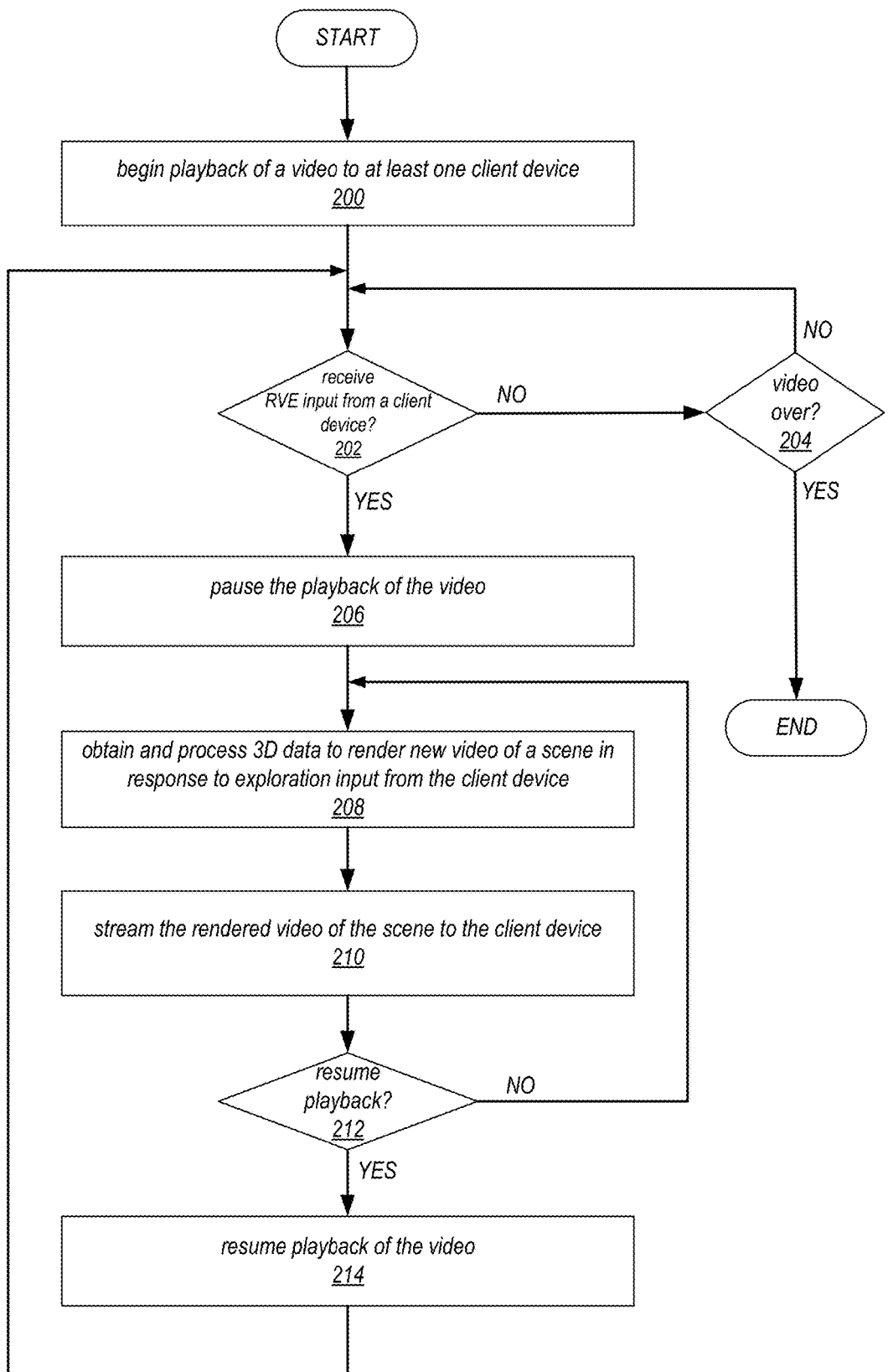
FIG. 6 is a flowchart of a method for exploring modeled worlds in real-time during playback of pre-recorded video, according to at least some embodiments.

FIG. 6 is a flowchart of a method for exploring 3D modeled worlds in real-time during playback of pre-recorded video according to at least some embodiments, and with reference to FIGS. 5A and 5B. As indicated at 200, an RVE system 100 may begin playback of a pre-recorded video to at least one client device 180. For example, an RVE control module 104 of the RVE system 100 may direct a video playback module 106 to begin playback of a selected video from a video source 150 to a client device 180 in response to selection input received from the client device 180. Alternatively, the RVE system 100 may begin playback of a pre-recorded video from a video source 150, and then receive input from one or more client devices 180 joining the playback to view (and possibly explore) the video content.

During playback of the pre-recorded video to the client device 180, additional input and interactions may be received by the RVE system 100 from an RVE client 182 on a client device 180. For example input may be received that indicates an RVE event in which the user 190 pauses the pre-recorded video being played back to the client device 180 so that the user 190 can explore the current scene. As indicated at 202, the RVE system 100 may continue to play back the pre-recorded video to the client device 180 until the video is over as indicated at 204, or until RVE input is received from the client device 180 that directs the RVE system 100 to pause the video. At 202, if RVE input requesting a pause of the video is received from a client device 180, the RVE system 100 pauses the replay of the video to the client device 180 at a current scene, as indicated at 206.

As indicated at 208, while the playback of the pre-recorded video is paused at a scene, the RVE system 100 may obtain and process 3D data to render new video of the scene in response to exploration input from the client device 180, and may stream the newly rendered video of the scene to the client device as indicated at 210. In at least some embodiments, the RVE system 100 may begin generating a 3D modeled world for the scene from the 3D data, rendering a 2D representations of the 3D modeled world, and streaming the real-time rendered video to the respective client device 180 in response to the pause event as indicated at 202 and 206. Alternatively, the RVE system 100 may begin generating a 3D modeled world for the scene from the 3D data, rendering a 2D representations of the 3D modeled world, and streaming the real-time rendered video to the respective client device 180 upon receiving additional exploratory input received from the client device 180, for example input changing the viewing angle of the viewer in the scene, or input moving the viewer's viewpoint through the scene. In response to additional user input and interactions received from the client device 180 indicating that the user is further exploring the scene, the RVE system 100 may render and stream new video of the scene from the 3D modeled world according to the current user input and 3D data, for example new video rendered from a particular position and angle within the 3D modeled world of the scene that is indicated by the user's current input to the client device 180. Alternatively, in some embodiments, the video may not be paused at 206, and the method may perform elements 208 and 210 while the video continues playback.

In at least some embodiments, in addition to allowing users to pause, step into, move through, and explore a scene in a pre-recorded video being played back, the RVE system 100 may allow a user to modify the scene, for example by adding, removing, or modifying graphics effects such as lens effects (e.g., fisheye, zoom, etc.), lighting effects (e.g., illumination, reflection, shadows, etc.), color effects (color palette, color saturation, etc.), or various simulated effects (e.g., rain, fire, smoke, dust, fog, etc.) to the scenes.

As indicated at 212, the RVE system 100 may continue to render and stream new video of the scene from the 3D modeled world in response to exploratory input until input is received from the client device indicating that the user wants to resume playback of the pre-recorded video. As indicated at 214, upon receiving resume playback input, the RVE system may resume playing back the pre-recorded video to the client device 180. The playback may, but does not necessarily, resume at the point where the playback was paused at 206.

In at least some embodiments, the RVE system 100 may leverage network-based computation resources and services (e.g., a streaming service) to receive the user input/interactions from within scene 704 on device 700, responsively generate or update a 3D model from the 3D data in response to the user input/interactions, render the new video content of the scene from the 3D model, and deliver the newly rendered video content (and possibly also audio) to the device 700 in real-time or near-real-time as a video stream. The computational power available through the network-based computation resources, as well as the video and audio streaming capabilities provided through a streaming protocol, may allow the RVE system 100 to provide low-latency responses to the user's interactions with the 3D world of the scene 704 as viewed on the device 700, thus providing a responsive and interactive exploratory experience to the user.

At least some embodiments of a real-time video exploration (RVE) system such as RVE system 100 shown in FIG. 5B may implement methods that allow users to discover, select, explore, and manipulate objects within the 3D modeled worlds used to generate video content (e.g., scenes in movies or other video). Leveraging network-based computation resources and services and utilizing the rich 3D content and data that was used to generate and render the original, previously rendered and recorded video, an RVE system 100 may allow a viewer of a video, for example a movie, to pause and "step into" a 3D rendered scene from the video via a client device, for example a device 180 as illustrated in FIG. 5C, to discover, select, explore, and manipulate objects within the scene. For example, a viewer can pause a movie at a scene and interact with one or more 3D-rendered object(s) in a scene. The viewer may select a 3D model of an object in the scene, pull up information on or relevant to the selected object, visually explore the object, and in general manipulate the object in various ways.

Figure 7:
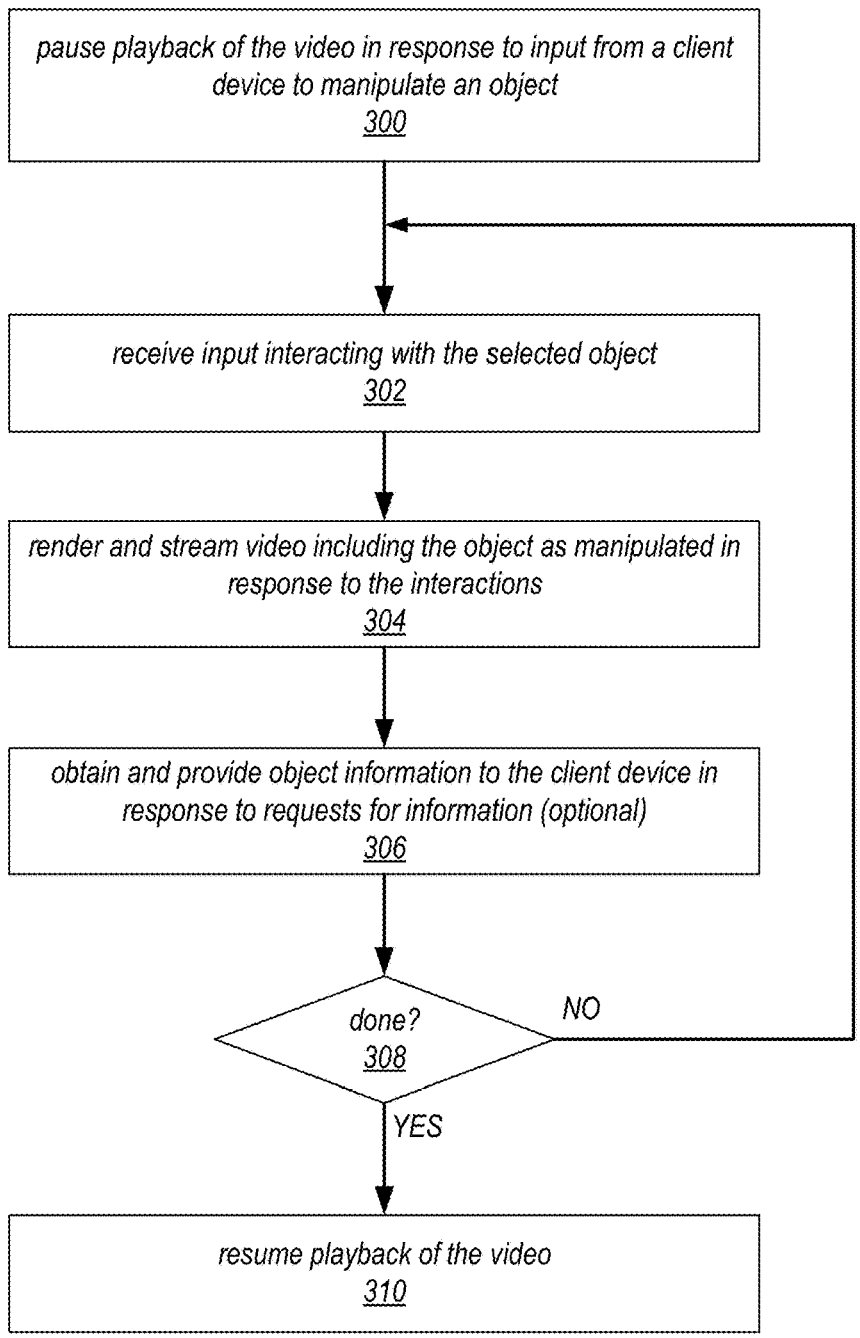
FIG. 7 is a flowchart of a method for interacting with objects and rendering new video content of the manipulated objects while exploring a video being played back, according to at least some embodiments.

FIG. 7 is a flowchart of a method for interacting with objects and rendering new video content of the manipulated objects while exploring a pre-recorded video being played back, according to at least some embodiments, and with reference to FIGS. 5A and 5B. As indicated at 300, the RVE system 100 may pause playback of a pre-recorded video being played back to a client device 180 in response to input received from the client device 180 to manipulate an object in a scene. In at least some embodiments, the RVE system 100 may receive input from the client device 180 selecting an object in a scene displayed on the device 180. In response, the RVE system 100 may pause the pre-recorded video being played back, obtain 3D data for the selected object, generate a 3D modeled world for the scene including a new 3D model of the object according to the obtained data, and render and stream new video of the scene to the client device 180.

Note that a selected object may be virtually anything that can be rendered from a 3D model. Non-limiting examples of objects that can be modeled within scenes, selected, and manipulated by embodiments include fictional or real devices or objects such as vehicles (cars, trucks, motorcycles, bicycles etc.), computing devices (smartphones tablet devices, laptop or notebook computers, etc.), entertainment devices (televisions and stereo components, game consoles, etc.), toys, sports equipment, books, magazines, CDs/albums, artwork (painting, sculptures, etc.) appliances, tools, clothes, and furniture; fictional or real plants and animals; fictional or real persons or characters; packaged or prepared foods, groceries, consumables, beverages, and so on; health care items (medicines, soap, shampoo, toothbrushes, toothpaste, etc.); and in general any living or non-living, manufactured or natural, real or fictional object, thing, or entity.

As indicated at 302, the RVE system 100 may receive input from the client device 180 indicating that the user is interacting with the selected object via the device 180. As indicated at 304, in response to the interactive input, the RVE system 100 may render and stream new video of the scene from the 3D modeled world including the 3D model of the object as manipulated or changed by the interactive input to the client device 180.

Non-limiting examples of manipulations of a selected object may include picking up an object, moving an object in the scene, rotating an object as if the object was held in the viewer's hands, manipulating movable parts of the object, or in general any physical manipulation of the object that can be simulated via 3D rendering techniques. Other examples of manipulations of an object may include changing the rendering of an object such as changing the lighting, texture, and/or color of the object, changing the opacity of the object so that the object is somewhat transparent, and so on. Other examples of object manipulations may include opening and closing doors in a house or on a vehicle, opening and closing drawers on furniture, opening and closing the, trunk, or other compartments on a vehicle, or in general any physical manipulation of components of an object that can be simulated via 3D rendering techniques. As just one non-limiting example, a user may step into a scene of a paused video to view a vehicle in the scene from all angles, open the doors and go inside the vehicle, open the console or glove compartment, and so on.

As indicated at 306, optionally, the RVE system 100 may obtain and provide information for a selected object to the client device 180 in response to a request for information. For example, in some embodiments, a user may double-tap on, right-click on, or otherwise select, an object to display a window of information about the object. As another example, in some embodiments, a user may double-tap on, or right-click on, a selected object to bring up a menu of object options, and select a "display info" option from the menu to obtain the object information.

Non-limiting examples of information on or relevant to a selected object that may be provided for a selected object may include descriptive information associated and possibly stored with the 3D model data or with the video being played back. In addition, the information may include, or may include links to, informational or descriptive web pages, advertisements, manufacturer or dealer web sites, reviews, BLOGs, fan sites, and so on. In general, the information that may be made available for a given object may include any relevant information that is stored with the 3D model data for the object or with the video, and/or relevant information from various other sources such as web pages or web sites. Note that an "object options" list may be displayed may include various options for manipulating a selected object, for example options to change color, texture, or other rendered features of the selected object. At least some of these options may be specific to the type of object.

As indicated at 308, the RVE system 100 may continue to render and stream new video of the scene in response to interactive input with object(s) in the scene. In at least some embodiments, the RVE system 100 may continue to render and stream new video of the scene until input is received from the client device indicating that the user wants to resume playback of the pre-recorded video. As indicated at 310, upon receiving resume playback input, the RVE system may resume playing back the pre-recorded video to the client device 180. The playback may, but does not necessarily, resume at the point where the playback was paused at 300.

In some embodiments, when an object is selected for manipulation, or when particular manipulations are performed on the selected object by the user, the RVE system 100 may access additional and/or different 3D graphics applications and/or apply additional or different 3D graphics techniques than were originally used to generate and render the object in the scene of the video being played back, and may render the object for exploration and manipulations according to the different applications and/or techniques. For example, the RVE system 100 may use additional or different techniques to add or improve texture and/or illumination for an object being rendered for exploration and manipulation by the user.

In some embodiments, when an object is selected for manipulation, or when particular manipulations are performed on the selected object by the user, the RVE system 100 may access a different 3D model of the object than the 3D model that was originally used to generate and render the object in the scene of the video being played back, and may render a 3D representation of the object from the different 3D model for exploration and manipulation by the user. The different 3D model may be a more detailed and richer model of the object than the one originally used to render the scene, and thus may provide finer detail and a finer level of manipulation of the object than would the less detailed model. As just one non-limiting example, a user can step into a scene of a paused video to view, select, and explore a vehicle in the scene. In response to selection of the vehicle for exploration and/or manipulation, the RVE system 100 may go to the vehicle's manufacturer site or to some other external source to access detailed 3D model data for the vehicle, which may then be rendered to provide the more detailed 3D model of the vehicle to the user rather than the simpler, less detailed, and possibly less current or up-to-date model that was used in originally rendering the video.

In addition, at least some embodiments of an RVE system 100 may implement methods that allow users to view and explore in more detail the features, components, and/or accessories of selected objects that are being manipulated and explored. For example, a user may be allowed to zoom in on a selected object to view features, components, and/or accessories of the selected object in greater detail. As simple, non-limiting examples, a viewer may zoom in on a bookshelf to view titles of books, or zoom in on a table to view covers of magazines or newspapers on the table. As another non-limiting example, a viewer may select and zoom in on an object such as a notepad, screen, or letter to view the contents in greater detail, and perhaps even to read text rendered on the object. As another non-limiting example, a computing device that is rendered in the background of a scene and thus not shown in great detail may be selected, manipulated, and zoomed in on to view fine details on the device's screen or of the device's accessories and interface components such as buttons, switches, ports, and keyboards, or even model or part numbers. As another non-limiting example, an automobile that is rendered in the background of a scene and thus not shown in great detail may be selected, manipulated, and zoomed in on to view fine details of the outside of the automobile. In addition, the viewer may open the door and enter the vehicle to view interior components and accessories such as consoles, navigation/GPS systems, audio equipment, seats, upholstery, and so on, or open the hood of the vehicle to view the engine compartment.

In addition to allowing users to select and manipulate objects in a scene as described above, at least some embodiments of an RVE system 100 may implement methods that allow users to interact with interfaces of selected objects or interfaces of components of selected objects. As an example of a device and interactions with a device that may be simulated by RVE system 100, a viewer may be able to select a rendered object representing a computing or communications device such as a cell phone, smart phone, tablet or pad device, or laptop computer, and interact with the rendered interface of the device to simulate actual operations of the device. As another example of a device and interactions with a device that may be simulated by RVE system 100, a user may enter an automobile rendered on the client device 180 and simulate operations of a navigation/GPS system in the automobile's console via the rendered representation of the navigation/GPS system's interface. The rendered object may respond appropriately to the user's interactions, for example by appropriately updating a touch-screen in response to a swipe or tap event. Reactions of a rendered object in response to the user's interactions via the rendered interface may, for example, be simulated by the RVE system 100 according to the object type and object data, or may be programmed, stored with, and accessed from the object's 3D model data or other object information.

In at least some embodiments, an RVE system 100 may leverage network-based computation resources and services (e.g., a streaming service) to receive the user's manipulations of objects in scenes on a client device, responsively generate or update 3D models of the scenes with modified renderings of the manipulated objects in response to the user input, render new video of the scenes, and deliver the newly rendered video to the client device in real-time or near-real-time as a video stream. The computational power available through the network-based computation resources, as well as the video and audio streaming capabilities provided through a streaming protocol, may allow the RVE system 100 to provide low-latency responses to the user's interactions with the objects in a scene, thus providing responsive and interactive manipulations of the objects to the user.

At least some embodiments of a real-time video exploration (RVE) system such as RVE system 100 shown in FIG. 5B may implement methods that allow users to interact with selected objects to customize or accessorize the objects. Leveraging network-based computation resources and services and utilizing 3D data for rendered objects in a video, an RVE system 100 may allow a viewer of the video, for example a movie, to pause and "step into" a 3D rendered scene from the video via a client device, for example a device 180 as illustrated in FIG. 5C, and to, discover, select, explore, and manipulate objects within the scene. In addition, for 3D-rendered objects in a scene that can be accessorized or customized with options, the viewer can manipulate or interact with a selected object to add or remove accessories, customize the object (change color, texture, etc.), or otherwise modify the object according to the user's preferences or desires. As a non-limiting example, a user may interact with a rendering of an automobile of a scene to accessorize or customize the car. For example, the user can change the exterior color, change the interior, change the car from a hardtop to a convertible, and add, remove, or replace accessories such as navigation/GPS systems, audio systems, special wheels and tires, and so on. In at least some embodiments, and for at least some objects, the RVE system 100 may also facilitate pricing, purchasing, or ordering of an object (e.g., a car) as accessorized or customized by the user via an interface on the client device.

Since the modifications to an object are done in a 3D-rendered scene/environment, the viewer can customize and/or accessorize an object such as an automobile and then view the customized object as rendered in the 3D world of the scene, with lighting, background, and so on fully rendered for the customized object. In at least some embodiments, the user-modified object may be left in the scene when the video is resumed, and the object as it appears in the original video in this and other scenes may be replaced with the rendering of the user's modified version of the object. Using an automobile as an example, the viewer may customize a car, for example by changing it from red to blue, or from a hardtop to a convertible, and then view the customized car in the 3D modeled world of the scene, or even have the customized car used in the rest of the video once resumed.

In at least some embodiments of an RVE system 100, the ability to customize and/or accessorize objects may, for at least some objects, be linked to external sources, for example manufacturer, dealer, and/or distributor information and website(s). The RVE system 100 may provide an interface, or may invoke an external interface provided by the manufacturer/dealer/distributor, via which the user can customize and/or accessorize a selected object if and as desired (e.g., an automobile, a computing device, an entertainment system, etc.), be given a price or price(s) for the object as customized/accessorized, and even order or purchase the object as specified if desired.

Figure 8:
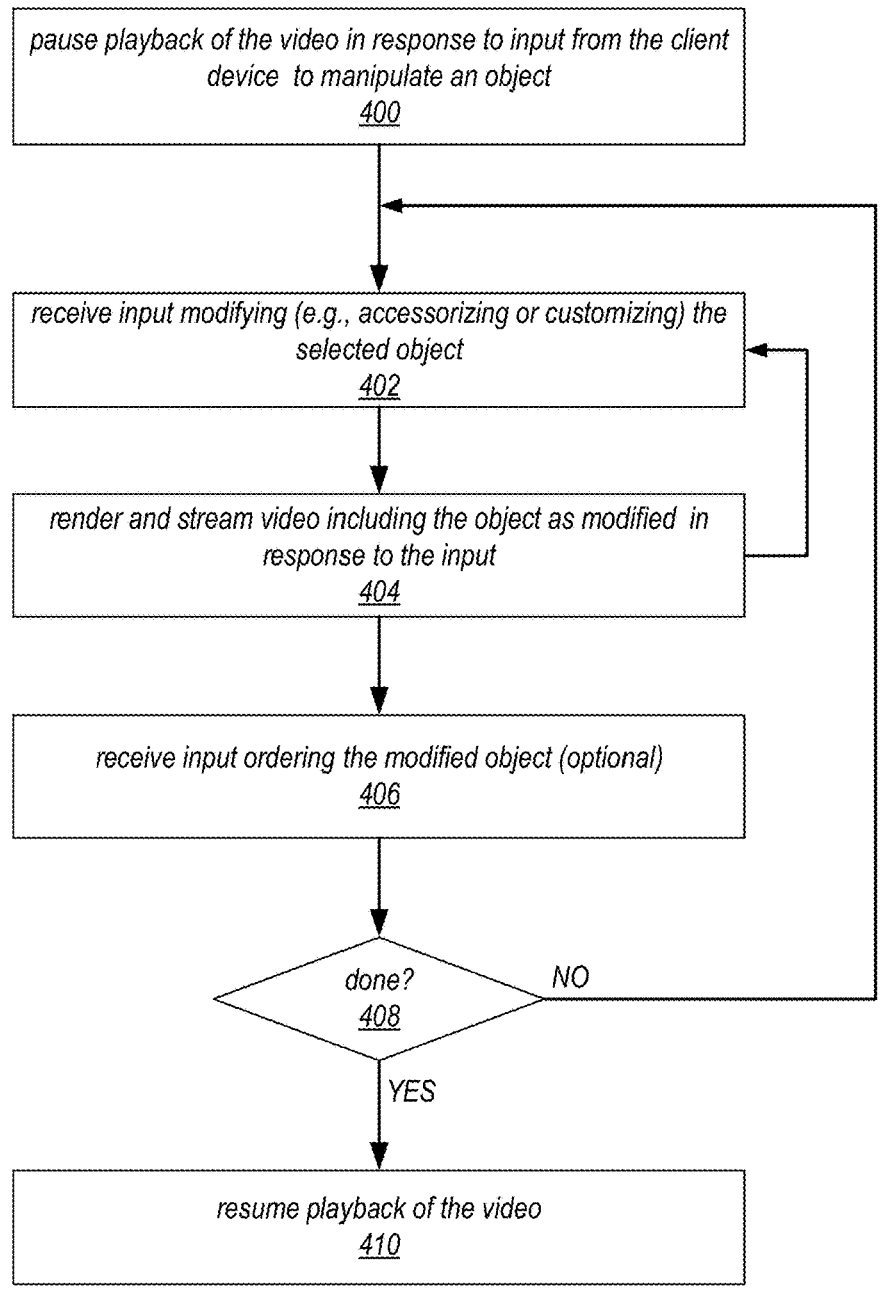
FIG. 8 is a flowchart of a method for modifying and ordering objects while exploring a video being played back, according to at least some embodiments.

FIG. 8 is a flowchart of a method for modifying, and optionally ordering, objects while exploring a video being played back, according to at least some embodiments, and with reference to FIGS. 5A and 5B. As indicated at 400, the RVE system 100 may pause playback of a pre-recorded video being played back to a client device 180 in response to input received from the client device 180 to manipulate an object in a scene. In at least some embodiments, the RVE system 100 may receive input from the client device 180 selecting an object in a scene displayed on the device 180. In response, the RVE system 100 may pause the pre-recorded video being played back, obtain 3D data for the selected object, generate a 3D modeled world for the scene including a new 3D model of the object according to the obtained data, and render and stream new video of the scene to the client device 180.

As indicated at 402, the RVE system 100 may receive input from the client device 180 indicating that the user is interacting with the selected object via the device to modify (e.g., accessorize or customize) the selected object. In response, the RVE system 100 may obtain additional 3D data for accessorizing or modifying the selected object, and generate a new 3D modeled world for the scene including a new 3D model of the object according to the modifications specified by the user input. As indicated at 404, the RVE system 100 may render and stream new video of the scene from the 3D modeled world including the 3D model of the object as modified by the input to the client device 180.

As shown at 406, optionally, the RVE system 100 may receive additional input from the client device 180 requesting additional information about the object as modified (e.g., pricing, availability, vendors, dealers, etc.), and/or additional information indicating that the user wants to purchase or order the object as modified (or as originally rendered, if desired). In at least some embodiments, in response to requests for additional information, the RVE system 100 may provide additional object information (e.g., websites, links, emails, documents, advertisements, pricing, reviews, etc.) to the user via client device 180. In at least some embodiments, in response to a request to order or purchase an item, the RVE system 100 may provide a name, location, URL, link, email address, phone number, and/or other information indicating one or more online or brick-and-mortar sources for ordering or purchasing the object. In some embodiments, the RVE system 100 may provide a purchasing interface via which the user can order the object as modified.

As indicated at 408, the RVE system 100 may continue to render and stream new video of the scene in response to interactions with object(s) in the scene. In at least some embodiments, the RVE system 100 may continue to render and stream new video of the scene until input is received from the client device indicating that the user wants to resume playback of the pre-recorded video. As indicated at 410, upon receiving resume playback input, the RVE system may resume playing back the pre-recorded video to the client device 180. The playback may, but does not necessarily, resume at the point where the playback was paused at 400.

Figure 11:
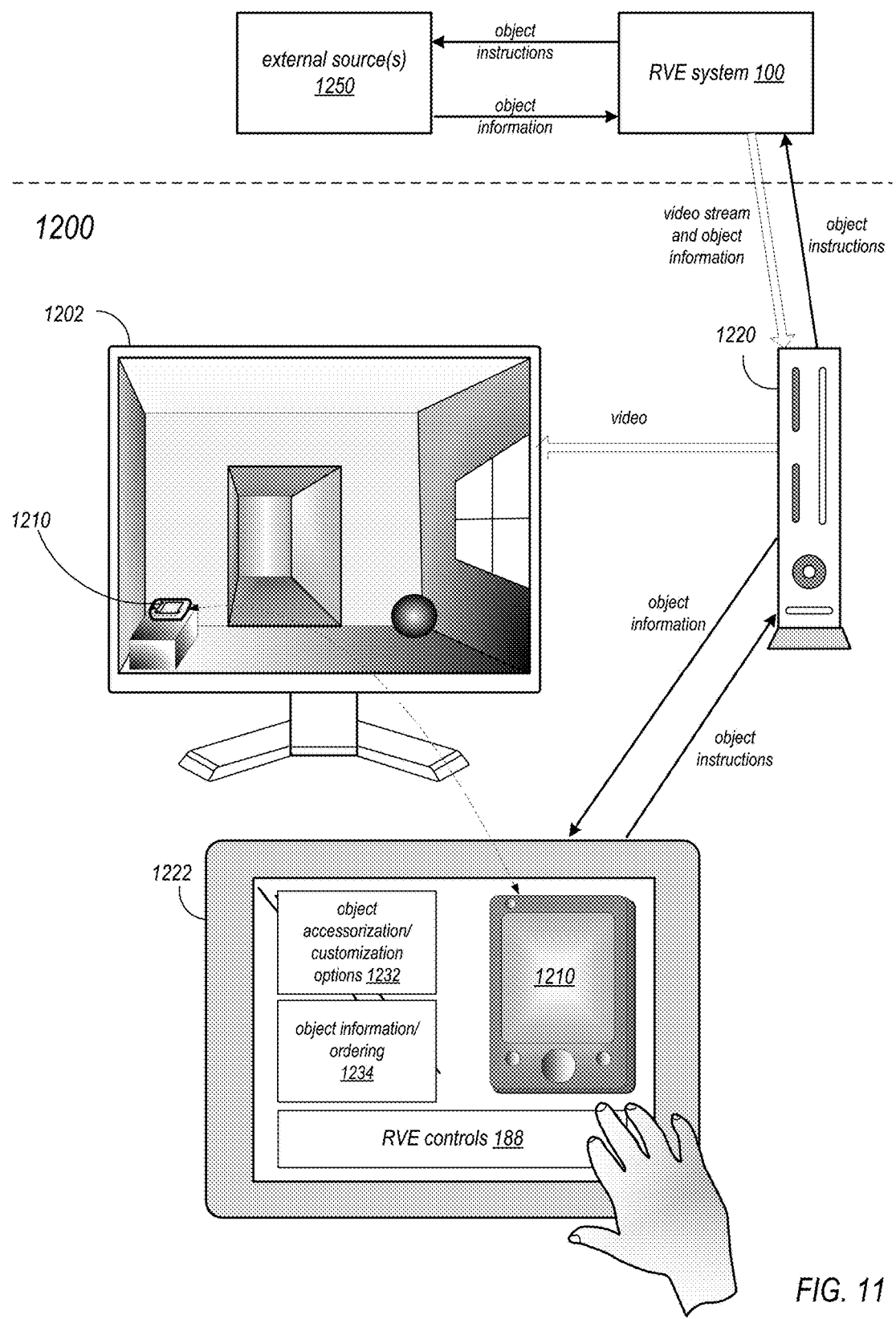
FIG. 11 illustrates an example RVE system and environment in which objects in a pre-recorded video can be modified, new video content including the modified objects can be generated and streamed, and objects from the video can optionally be ordered, according to at least some embodiments.

FIG. 11 illustrates an example RVE system and environment in which objects in a pre-recorded video can be modified, new video content including the modified objects can be generated and streamed, information on objects can be obtained, and objects from the video can optionally be ordered, according to at least some embodiments. In FIG. 11, an RVE client device 1200 uses a "second screen" 1222 to explore the video content, according to at least some embodiments. Client device 1200 may include a first display 1202 and a second display 1222 or "second screen" coupled (via wired or wireless connections) to a central unit 1220. Central unit 1220 may, for example, be a game controller, a set-top box, a desktop or other computer, a cable box or modem, or in general any device or unit that can communicate with RVE system 100 and displays 1202 and 1222. An example computing device that may be used as a central unit 1220 is illustrated in FIG. 15.

Video streamed from RVE system 100 to device 1200 may be received at central unit 1220, processed, and displayed to display 1202. Initially, the streamed video may be a pre-recorded video being played back to device 1200 from the RVE system 100. Via RVE controls 188 (see, e.g., FIG. 5C) displayed on second screen 1222, the user may pause the video at a scene 1204. The user may then use RVE controls 188 to explore the scene 1204 (e.g., change viewing angles, changes positions, etc.), to select and manipulate objects, such as object 1210, and to modify objects such as object 1210 by accessorizing or otherwise customizing the objects. In this example, the selected object 1210 is a consumer electronic device such as a smartphone, PDA, or tablet device. However, note that the object 1210 may be virtually anything that can be rendered from a 3D model and that can be manipulated, customized, and/or accessorized.

In FIG. 11, the user has selected object 1210 in the scene 1204 using RVE controls 188, and the scene 1204 is paused. In at least some embodiments, the user may interact with the displayed object 1210 via RVE controls 188 on second screen 1222 to manipulate the object and/or to obtain more information about the object 1210. In at least some embodiments, a detailed rendering of the selected object 1210 may be displayed to the second screen 1222. The RVE system 100 may obtain information about the selected object 1210, for example from one or more external sources 1250, and may provide the obtained information for the selected object 1210 to the client device 1200 in response to the request for information. For example, in some embodiments, the user may use RVE controls 188 on device 1222 to select the object 1210; in response to the selection, information about the object 1210 may be displayed to the second screen 1222 device, for example to a window 1234, and a detailed rendering of the object 1210 may also be displayed.

In at least some embodiments, one or more accessorization and customization options for modifying the object 1210 may be displayed to a window 1232. The user may then use the interface presented on second screen 1222 to accessorize or customize the object 1210 according to the available options. The object modification input may be received by central unit 1220 and forwarded to RVE system 100. In response to the object modification input, the RVE system 100 may obtain additional 3D data for accessorizing or modifying the selected object 1210, for example from one or more external sources 1250, and generate a new 3D modeled world for the scene including a new 3D model of the object according to the modifications specified by the user input. The RVE system 100 may then render and stream new video of the scene from the 3D modeled world including the 3D model of the object as modified by the input to the client device 1200. At the client device, the modifications to the object 1210 may be reflected on the object 1210 displayed on the second screen 1222 and/or on the object 1210 displayed in scene 1204.

In at least some embodiments of an RVE system 100, the ability to customize and/or accessorize objects may, for at least some objects, be linked to external sources 1250, for example manufacturer, dealer, and/or distributor information and website(s). The RVE system 100 may provide an interface, or may invoke an external interface 1234 such as a web page provided by the manufacturer/dealer/distributor, via which the user can customize and/or accessorize a selected object if and as desired (e.g., an automobile, a computing device, an entertainment system, etc.), be given information including but not limited to a price or price(s) for the object as customized/accessorized, and even order or purchase the object from an external source 1250 as specified if desired. In FIG. 11, the interface for customizing and/or accessorizing a selected object, obtaining information such as pricing about the object, and ordering the object if desired is shown on second screen 1222 as object accessorization/customization options window 1232 and object information/ordering window 1234.

In at least some embodiments of an RVE system 100, in addition to customizing or accessorizing a selected object 1210, a user may be allowed to replace an object 1210 with a different object. In FIG. 11, for example, the selected object 1210 is a consumer electronic device such as a smartphone, PDA, or tablet device, and in some embodiments the user may be allowed to replace the device with a device of another brand or make. Using an automobile as an example, the viewer may replace one type of car in the 3D rendered environment with another type of car, and then view the different car in the 3D modeled world of the scene, or even have the different car used in the rest of the video once resumed.

Referring to FIG. 11, in at least some embodiments, an RVE system 100 may leverage network-based computation resources and services (e.g., a streaming service) to receive the user's modifications of objects in scenes on a client device, responsively generate or update 3D models of the scenes with modified renderings of the objects in response to the user input, render new video of the scenes, and deliver the newly rendered video to the client device in real-time or near-real-time as a video stream. The computational power available through the network-based computation resources, as well as the video and audio streaming capabilities provided through a streaming protocol, may allow the RVE system 100 to provide low-latency responses to the user's modifications of the objects in a scene, thus providing responsive and interactive modifications of the objects to the user.

Figure 10A:
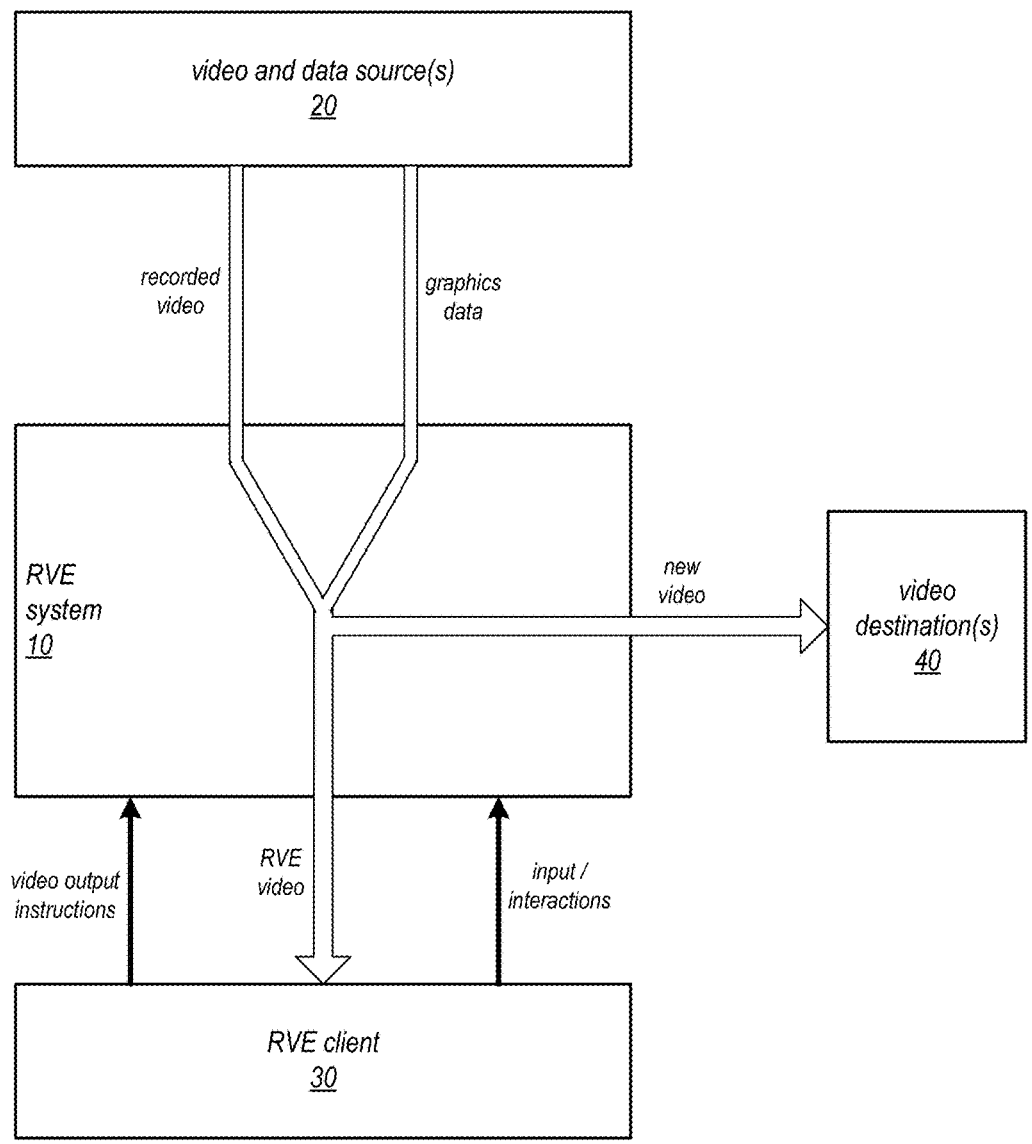
FIG. 10A is a high-level illustration of a real-time video exploration (RVE) system that enables the generation of new video from pre-recorded video, according to at least some embodiments.

At least some embodiments of a real-time video exploration (RVE) system 10 may allow a user to generate their own customized version of a video such as a movie. The generated video may be recorded for later playback, or may be streamed or broadcast "live" to other endpoints or viewers. FIG. 10A is a high-level illustration of a real-time video exploration (RVE) system 10 that enables the generation and output of new video from pre-recorded video, according to at least some embodiments. A user may interact with video via an RVE client 30 to generate modified or customized video from pre-recorded video and graphics data obtained from one or more sources 20. In at least some embodiments, the RVE system 10 may play back video from one or more sources 20 to the RVE client 30, receive user input/interactions within scenes being explored from the respective RVE client 30, responsively generate or update 3D models from graphics data obtained from one or more sources 20 in response to the user input/interactions exploring the scenes, render new video content of the scenes at least in part from the 3D models, and deliver the newly rendered video content (and audio, if present) to the respective RVE client 30 as RVE video.

For example, a user may pause a video being replayed at a scene, change the viewing angle and/or viewing position for the scene via a user interface to the RVE system 10 (e.g., RVE controls 188 as shown in FIG. 5C), and re-render a portion of or the entire scene using the modified viewing angle and/or position, for example using a method as illustrated in FIG. 6. As another example, the user may modify the scene by adding, removing, or modifying various graphics effects such as lens effects, lighting effects, color effects, or various simulated effects to the scene. The user may do this for one or more scenes in a video (e.g., a movie), to generate a new version of the entire video or a portion thereof including the modified and re-rendered views of the scene(s).

As another example, the user may manipulate, modify, customize, accessorize and/or rearrange objects in one or more scenes of a video using one or more of the methods previously described, for example in FIGS. 7 and 8, and/or remove or add objects to a scene, to generate a new version of the entire video or a portion thereof including the modified object(s) in the scene(s). One or more of these methods, or combinations of two or more of these methods, may be used to modify or customize a given scene or video.

The user may interact with RVE system 10 via RVE client 30 to record, stream, and/or broadcast the new video to one or more destinations 40. The new versions of videos or portions of videos so produced may, for example, be stored or recorded to local or remote storage, shown to or shared with friends, or may be otherwise recorded, stored, shared, streamed, broadcast, or distributed assuming the acquisition of appropriate rights and permissions to share, distribute, or broadcast the new video content. In at least some embodiments, RVE system 10 may provide one or more application programming interfaces (APIs) for receiving input from and sending output to RVE client(s) 30.

Figure 9:
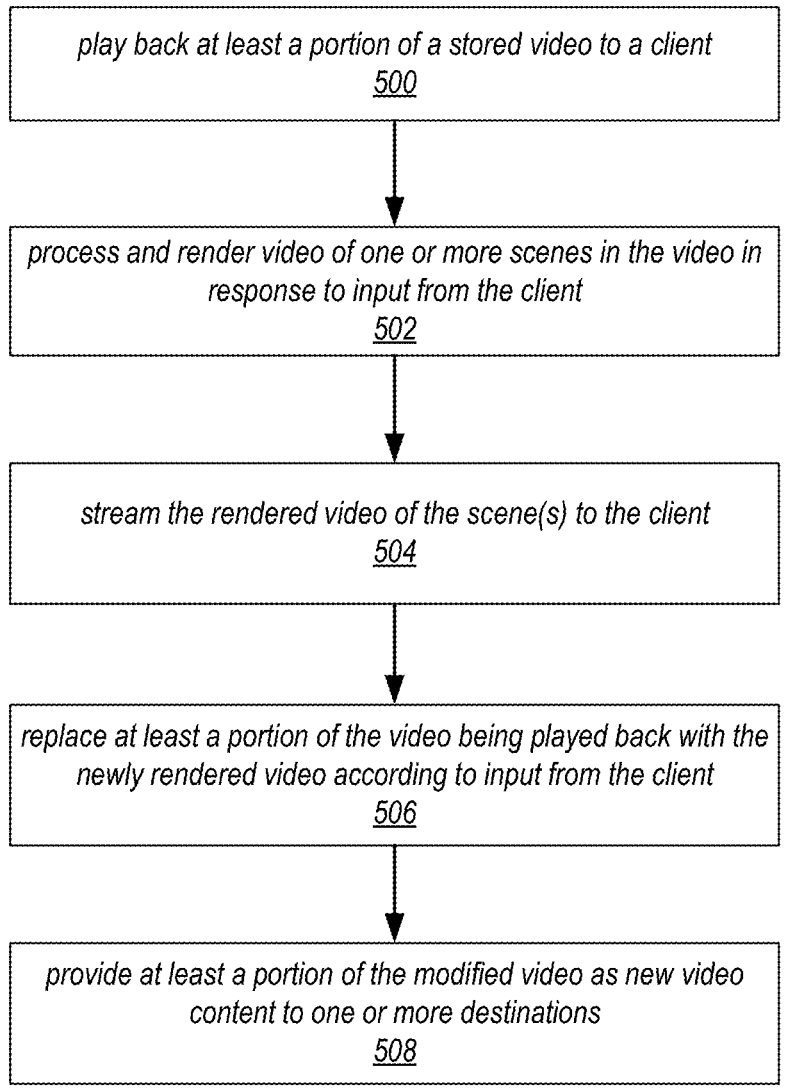
FIG. 9 is a flowchart of a method for rendering and storing new video content during playback of pre-recorded video, according to at least some embodiments.

FIG. 9 is a flowchart of a method for rendering and storing new video content during playback of pre-recorded video, according to at least some embodiments, and with reference to FIG. 10A. As indicated at 500, an RVE system 10 may play back at least a portion of a pre-recorded video to an RVE client 30. As indicated at 502, the RVE system 10 may process and render video of one or more scenes in the video in response to input from the RVE client 30. For example, in at least some embodiments, a user may pause a video being replayed, change the viewing angle and/or viewing position for the scene, and re-render the scene or a portion thereof using the modified viewing angle and/or position, for example using a method as described in FIG. 2 and illustrated in FIGS. 7A and 7B. As another example, the user may manipulate, modify, customize, accessorize and/or rearrange objects in one or more scenes, for example as described in FIGS. 3 and 4 and illustrated in FIGS. 8A through 12. Note that one or more of these methods, or combinations of two or more of these methods, may be used to modify a given scene or portions of a scene. As indicated at 504, the RVE system 10 may stream the newly rendered video of the scene to the RVE client 30. As indicated at 506, at least a portion of the video being played back may be replaced with the newly rendered video according to input from the RVE client 30. For example, one or more scenes in the original video may be replaced with newly rendered scenes recorded from modified perspectives and/or including modified content to generate a new version of the original video. As indicated at 508, at least a portion of the modified video may be provided to one or more destinations 30 as new video content. New versions of videos or portions of videos so produced may, for example, be recorded or stored to local or remote storage, shown to or shared with friends, or may be otherwise stored, shared, streamed, broadcast, or distributed assuming the acquisition of appropriate rights and permissions to share or distribute the new video content.

The elements of FIG. 9 are explained below in more detail with further reference to FIGS. 10B and 10C.

Figure 10B:
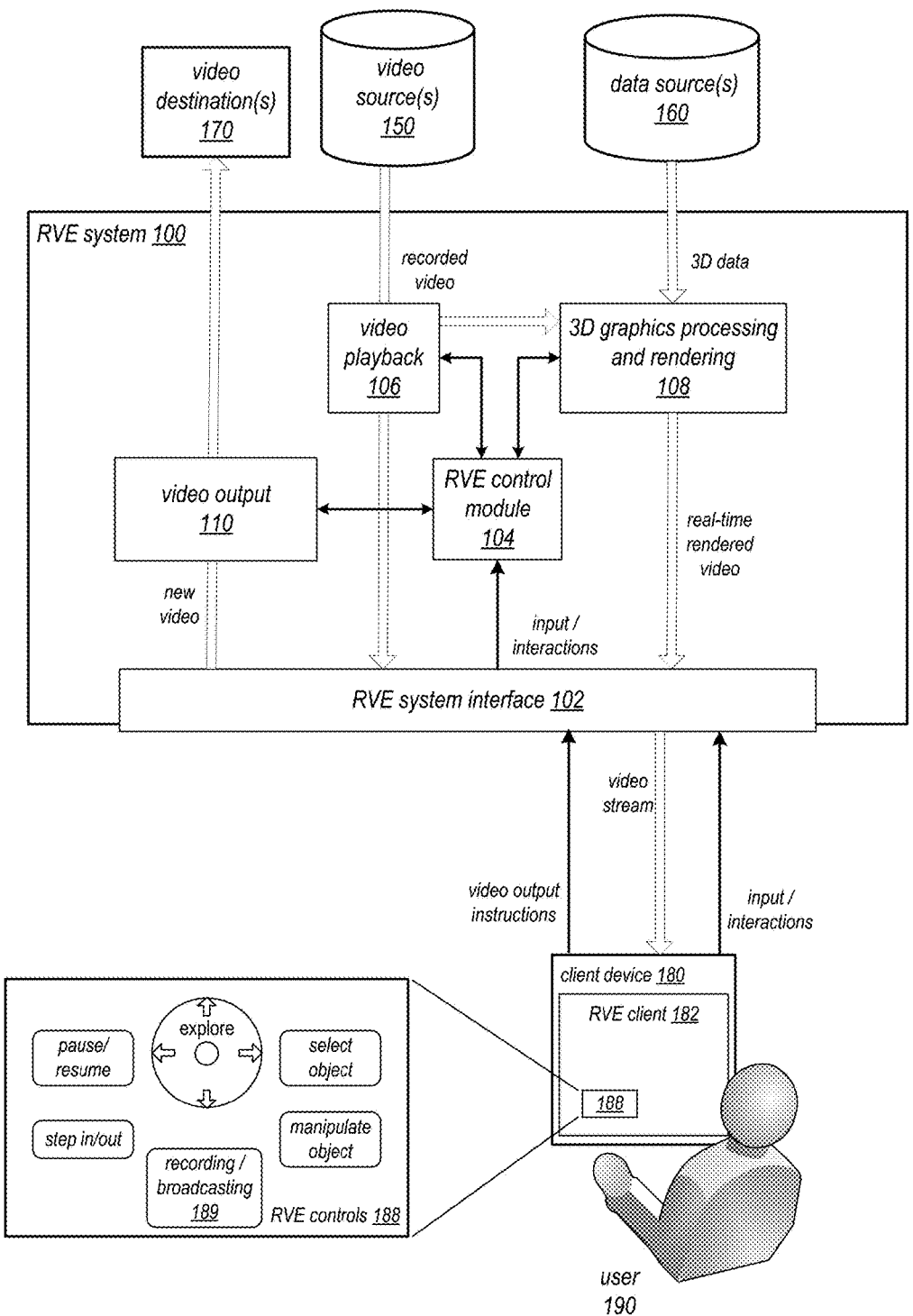
FIGS. 10B and 10C illustrate example real-time video exploration (RVE) systems and environments in which users can render and store new video content during playback of a pre-recorded video, according to at least some embodiments.
Figure 10C:
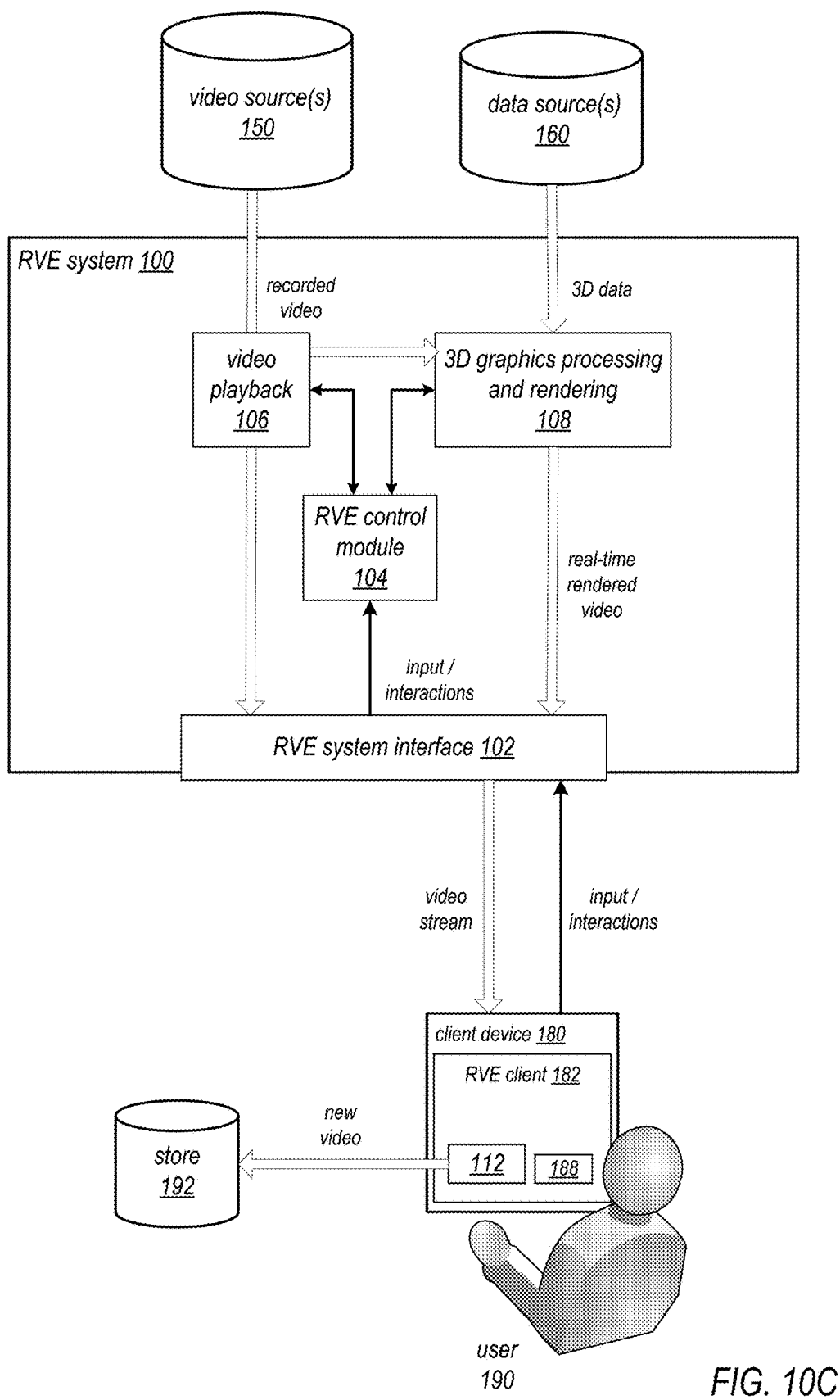

FIGS. 10B and 10C illustrate example real-time video exploration (RVE) systems 100 in RVE environments in which users can generate, render and store new video content during playback of a pre-recorded video, according to at least some embodiments. As shown in FIG. 10B, in at least some embodiments, an RVE environment may include an RVE system 100 and one or more client devices 180. An example client device 180 that may be used is shown in FIG. 5C. A client device 180 may implement an RVE client 182 and RVE controls 188. The RVE system 100 has access to stores or other sources of pre-rendered, pre-recorded video, shown as video source(s) 150. The RVE system 100 also has access to stores or other sources of data and information including but not limited to 3D graphics data, shown as data source(s) 160. The 3D graphics data may include, but is not limited to, data that was used in generating and rendering scenes for at least some of the pre-recorded video available from video sources 150, and may also include additional 3D graphics data.

As shown in FIG. 10B, in at least some embodiments, the RVE system 100 may include a video playback 106 module or component and an RVE system interface 102. In at least some embodiments, RVE system interface 102 may be or may include one or more application programming interfaces (APIs) for receiving input from and sending output to RVE client(s) 182 on client device(s) 180. In response to user selection of a video for playback to client device 180, the video playback 106 module may obtain pre-rendered, pre-recorded video from a video source 150, process the video as and if necessary, and stream the pre-recorded video to the respective client device 180 via RVE system interface 102. The RVE system 100 may also include a 3D graphics processing and rendering 108 module or component. During an RVE event in which the user 190 pauses a video being played back to client device 180, steps into a scene, explores, and possibly modifies video content such as rendered objects via RVE client 182, 3D graphics processing and rendering 108 module may obtain 3D data from one or more data sources 160, generate a 3D modeled world for the scene according to the obtained 3D data and user input, render 2D representations of the 3D modeled world from user-controlled camera viewpoints, and stream the real-time rendered video to the respective client device 180 via RVE system interface 102.

As shown in FIG. 10B, in at least some embodiments, the RVE system 100 may also include a video output 110 module or component that may record and/or broadcast new video content generated in the RVE environment to one or more destinations 170. For example, during (or after) an RVE event in which new video content is generated and rendered from pre-recorded video being played back, video output 110 module may receive at least a portion of the real-time rendered video from 3D graphics processing and rendering 108 module and record the new video to a video destination 170. In some embodiments, video output 110 module may also receive at least a portion of the pre-recorded video being played back through video playback 106 module and merge or combine the real-time rendered video with the pre-recorded video, for example by replacing particular scenes or portions thereof in the original, pre-recorded video and recording and/or broadcasting the results as new video to one or more destinations 170

As shown in FIG. 10B, in at least some embodiments, the RVE system 100 may also include an RVE control module 104 that receives input and interactions from an RVE client 182 on a respective client device 180 via RVE system interface 102, processes the input and interactions, and directs operations of video playback module 106, 3D graphics processing and rendering 108 module, and new video output 110 module accordingly. In at least some embodiments, the input and interactions may be received according to an API provided by RVE system interface 102.

In at least some embodiments, user 190 may modify one or more scenes of a video being played back by video playback 106 module RVE system 100 using an RVE controls 188 interface to RVE system 100 as implemented by an RVE client 182 on a client device 180. An example of a client device 180 and RVE client 182 are shown in FIG. 5C. For example, in at least some embodiments, a user 190 may pause a video being replayed via video playback 106 module, change the viewing angle and/or viewing position for the scene via RVE controls 188, and re-render the scene or a portion thereof using the modified viewing angle and/or position, for example using a method as described in FIG. 6. As another example, the user 190 may manipulate, modify, customize, accessorize and/or rearrange objects in one or more scenes, for example as described in FIGS. 7 and 8. Note that one or more of these methods, or combinations of two or more of these methods, may be used to modify a given scene or portions of a scene. The user may use these methods to modify one, two, or more scenes or portions thereof in a video (e.g., a movie).

In at least some embodiments, in addition to controls for pausing, exploring, and modifying video content of scenes in a video being played back from RVE system 100, the RVE controls 188 interface may include one or more controls 189 via which the user 190 may record and/or broadcast new video content generated by 3D graphics processing and rendering 108 module according to the user's modifications and manipulations of scenes from a pre-recorded video (e.g., movie) being played back. In at least some embodiments, using controls 189 of the RVE controls 188 interface, the user 190 may be able to selectively specify which parts of a video being played back are to be replaced by new video content rendered by 3D graphics processing and rendering 108 module. The user 190 may also be able to perform various other recording and/or broadcasting functions using controls 189 of the RVE controls 188 interface. As a non-limiting example, in at least some embodiments, the user 190 may be able to create new video content by combining one or more newly rendered scenes or portions of scenes as modified by the user from scenes in one or more videos.

As an example method of recording new video, in at least some embodiments, a user 190 may change the viewing angle and/or viewing position for the scene via RVE controls 188, re-render the scene or a portion thereof using the modified viewing angle and/or position, and select a "record scene" option from RVE controls 188. Instead or in addition, the user 190 may manipulate, modify, customize, accessorize and/or rearrange objects in a scene and select a "record scene" option from RVE controls 188. In at least some embodiments, each modified scene that the user 190 so records may be recorded to one or more destinations 170 as new video content by a video output 110 component of RVE system 100, for example to a local store of client device 180 or to a remote store (e.g., video source(s) 150) accessed and provided through RVE system 100. In at least some embodiments, the user 190 may direct RVE system 100 to combine two or more such scenes into new video content using RVE controls 188. In response, video output 110 module of the RVE system 100 may combine the scenes into a single, new video segment and store the new video. In at least some embodiments of an RVE system 100, modified and rendered scenes generated from two or more pre-recorded videos may be combined to produce new video content.

As another example method of recording new video, in at least some embodiments, a user 190 may modify one or more scenes of a pre-recorded video (e.g., a movie) being played back by changing viewpoint positions and angles and/or by manipulating various object(s), save particular ones of the modifications or modified scenes, and then select a "record new version of video" option from RVE controls 188. In response, video output 110 module may generate and record a new version of the video by combining new video content rendered by 3D graphics processing and rendering 108 module with video content from the original video. For example, one or more scenes or portions thereof in the original video may be replaced with new versions of the scenes as rendered by 3D graphics processing and rendering 108 module.

In at least some embodiments, instead of or in addition to recording new video and playing back the recorded new video, the RVE system 100 may enable the real-time streaming or broadcasting of new video generated by a user via an RVE client 182 as described herein to one, two, or more other endpoints as destinations 170 for display. An endpoint may, for example, be another RVE client 182 on another client device 180. However, an endpoint may be any device configured to receive and display a video stream from RVE system 100. As an example of broadcasting new video, in some embodiments a user may use an RVE client 182 on a client device 180 to perform a "video DJ" function in which the user customizes input video using the RVE system 100 in real-time and broadcasts the customized video via the RVE system 100 in real-time to one or more endpoints, for example one or more local or remote devices configured to display video received in streams from RVE system 100.

FIG. 10B shows a video output 110 module implemented by RVE system 100. However, as shown in FIG. 10C, in some embodiments a video output 112 module may instead or in addition be implemented by an RVE client 182 on a client device 180. During an RVE event in which new video content is generated and rendered by 3D graphics processing and rendering 108 module from pre-recorded video being played back by video playback 106 module and streamed to the client device 180 through RVE system interface 102, video output 112 module on client device 180 may receive and record at least a portion of the video being streamed from RVE system 100 to client device 180 to a store 192.

Store 192 may, for example, be a local store of client device 180, or network-based storage. Note that the video being streamed from RVE system 100 to client device 180 may include real-time rendered video from 3D graphics processing and rendering 108 module as well as pre-recorded video being played back through video playback 106 module.

Example Real-Time Video Targeting/Exploring (RVT/E) Network Environments

Embodiments of real-time video targeting (RVT) and/or real-time video explorer (RVE) systems that implement one or more of the various methods as described herein may be implemented in the context of a service provider that provides virtualized resources (e.g., virtualized computing resources, virtualized storage resources, virtualized database (DB) resources, etc.) on a provider network to clients of the service provider, for example as illustrated in FIG. 12. For convenience, the RVT and RVE systems may be referred to collectively as real-time video targeting/exploring (RVT/E) systems. However, note that an RVT/E system 2510 on a provider network 2500 as shown in FIG. 12 may implement the RVT and RVE methods as described herein, or alternatively may implement only the RVT methods or only the RVE methods. Virtualized resource instances on the provider network 2500 may be provisioned via one or more provider network services 2502 and may be rented or leased to clients of the service provider, for example to an RVT/E system provider 2590 that implements RVT/E system 2510 on provider network 2502. At least some of the resource instances on the provider network 2500 may be computing resources 2522 implemented according to hardware virtualization technology that enables multiple operating systems to run concurrently on a host computer, i.e. as virtual machines (VMs) on the host. Other resource instances (e.g., storage resources 2552) may be implemented according to one or more storage virtualization technologies that provide flexible storage capacity of various types or classes of storage to clients of the provider network. Other resource instances (e.g., database (DB) resources 2554) may be implemented according to other technologies.

In at least some embodiments, the provider network 2500, via the services 2502, may enable the provisioning of logically isolated sections of the provider network 2500 to particular clients of the service provider as client private networks on the provider network 2500. At least some of a client's resources instances on the provider network 2500 may be provisioned in the client's private network. For example, in FIG. 12, RVT/E system 2510 may be implemented as or in a private network implementation of RVT/E system provider 2590 that is provisioned on provider network 2500 via one or more of the services 2502.

The provider network 2500, via services 2502, may provide flexible provisioning of resource instances to clients in which virtualized computing and/or storage resource instances or capacity can be automatically added to or removed from a client's configuration on the provider network 2500 in response to changes in demand or usage, thus enabling a client's implementation on the provider network 2500 to automatically scale to handle computation and/or data storage needs. For example, one or more additional computing resources 2522A, 2522B, 2522C, and/or 2522D may be automatically added to RVT/E system 2510 in response to an increase in the number of RVT/E clients 2582 accessing RVT/E system 2510 to play back and explore video content as described herein. If and when usage drops below a threshold, computing and data storage resources that are no longer necessary can be removed.

In at least some embodiments, RVT/E system provider 2590 may access one or more of services 2502 of the provider network 2500 via application programming interfaces (APIs) to the services 2502 to configure and manage an RVT/E system 2510 on the provider network 2500, the RVT/E system 2510 including multiple virtualized resource instances (e.g., computing resources 2522, storage resources 2552, DB resources 2554, etc.).

Provider network services 2502 may include but are not limited to, one or more hardware virtualization services for provisioning computing resource 2522, one or more storage virtualization services for provisioning storage resources 2552, and one or more database (DB) services for provisioning DB resources 2554. In some implementations, RVT/E system provider 2590 may access two or more of these provider network services 2502 via respective APIs to provision and manage respective resource instances in RVT/E system 2510. However, in some implementations, RVT/E system provider 2590 may instead access a single service (e.g., a streaming service 2504) via an API to the service 2504; this service 2504 may then interact with one or more other provider network services 2502 on behalf of the RVT/E system provider 2590 to provision the various resource instances in the RVT/E system 2510.

In some embodiments, provider network services 2502 may include a streaming service 2504 for creating, deploying, and managing data streaming applications such as an RVT/E system 2510 on a provider network 2500. Many consumer devices, such as personal computers, tables, and mobile phones, have hardware and/or software limitations that limit the devices' capabilities to perform 3D graphics processing and rendering of video data in real time. In at least some embodiments, a streaming service 2504 may be used to implement, configure, and manage an RVT/E system 2510 that leverages computation and other resources of the provider network 2500 to enable real-time, low-latency 3D graphics processing and rendering of video on provider network 2500, and that implements a streaming service interface 2520 (e.g., an application programming interface (API)) for receiving RVT/E client 2582 input and for streaming video content including real-time rendered video as well as pre-recorded video to respective RVT/E clients 2582. In at least some embodiments, the streaming service 2504 may manage, for RVT/E system provider 2590, the deployment, scaling, load balancing, monitoring, version management, and fault detection and recovery of the server-side RVT/E system 2510 logic, modules, components, and resource instances. Via the streaming service 2504, the RVT/E system 2510 can be dynamically scaled to handle computational and storage needs, regardless of the types and capabilities of the devices that the RVT/E clients 2582 are implemented on.

In at least some embodiments, at least some of the RVT/E clients 2582 may implement an RVT/E client interface 2684 as shown in FIG. 13 for communicating user input and interactions to RVT/E system 2510 according to the streaming service interface 2520, and for receiving and processing video streams and other content received from the streaming service interface 2520. In at least some embodiments, the streaming service 2504 may also be leveraged by the RVT/E system provider 2590 to develop and build RVT/E clients 2582 for various operating system (OS) platforms on various types of client devices (e.g., tablets, smartphones, desktop/notebook computers, etc.).

Referring to FIG. 12, in at least some embodiments, data including but not limited to video content may be streamed from the streaming service interface 2520 to the RVT/E client 2582 according to a streaming protocol. In at least some embodiments, data including but not limited to user input and interaction may be sent to the streaming service interface 2520 from the RVT/E client 2582 according to the streaming protocol. In at least some embodiments, the streaming service interface 2520 may receive video content (e.g., rendered video frames) from a video playback module (not shown) and/or from a rendering 2560 module, package the video content according to the streaming protocol, and stream the video according to the protocol to respective RVT/E client(s) 2582 via intermediate network 2570. In at least some embodiments, an RVT/E client interface 2684 of the RVT/E client 2582 may receive a video stream from the streaming service interface 2520, extract the video content from the streaming protocol, and forward the video to a display component of the respective client device for display.

Referring to FIG. 12, an RVT/E system provider 2590 may develop and deploy an RVT/E system 2510, leveraging one or more of services 2502 to configure and provision RVT/E system 2510. As shown in FIG. 12, the RVT/E system 2510 may include and may be implemented as multiple functional modules or components, with each module or component including one or more provider network resources. In this example, RVT/E system 2510 includes a streaming service interface 2520 component that includes computing resources 2522A, an RVT/E control module 2530 that includes computing resources 2522B, 3D graphics processing 2540 module that includes computing resources 2522C, 3D graphics rendering 2560 module that includes computing resources 2522D, and data storage 2550 that includes storage resources 2552 and database (DB) resources 2554. Note that an RVT/E system 2510 may include more or fewer components or modules, and that a given module or component may be subdivided into two or more submodules or subcomponents. Also note that two or more of the modules or components as shown can be combined; for example, 3D graphics processing 2540 module and 3D graphics rendering 2560 module may be combined to form a combined 3D graphics processing and rendering module.

One or more computing resources 2522 may be provisioned and configured to implement the various modules or components of the RVT/E system 2510. For example streaming service interface 2520, RVT/E control module 2530, 3D graphics processing 2540 module, and 3D graphics rendering 2560 may each be implemented as or on one or more computing resources 2522. In some embodiments, two or more computing resources 2522 may be configured to implement a given module or component. For example, two or more virtual machine instances may implement an RVT/E control module 2530. However, in some embodiments, an instance of a given module (e.g., an instance of 3D graphics processing 2540 module, or an instance of 3D graphics rendering 2560 module) may be implemented as or on each of the computing resource 2522 instances shown in the module. For example, in some implementations, each computing resource 2522 instance may be a virtual machine instance that is spun up from a machine image implementing a particular module, for example a 3D graphics processing 2540 module, that is stored on storage resource(s) 2552.

In at least some embodiments, computing resources 2522 may be specifically provisioned or configured to support particular functional components or modules of the RVT/E system 2510. For example, computing resources 2522C of 3D graphics processing 2540 module and/or computing resources 2522D of 3D graphics rendering module 2560 may be implemented on devices that include hardware support for 3D graphics functions, for example graphics processing units (GPUs). As another example, the computing resources 2522 in a given module may be fronted by a load balancer provisioned through a provider network service 2502 that performs load balancing across multiple computing resource instances 2522 in the module.

In at least some embodiments, different ones of computing resources 2522 of a given module may be configured to perform different functionalities of the module. For example, different computing resources 2522C of 3D graphics processing 2540 module and/or different computing resources 2522D of 3D graphics rendering module 2560 may be configured to perform different 3D graphics processing functions or apply different 3D graphics techniques. In at least some embodiments, different ones of the computing resources 2522 of 3D graphics processing 2540 module and/or 3D graphics rendering module 2560 may be configured with different 3D graphics applications. As an example of using different 3D graphics processing functions, techniques, or applications, when rendering objects for video content to be displayed, 3D data for the object may be obtained that needs to be processed according to specific functions, techniques, or applications to generate a 3D model of the object and/or to render a 2D representation of the object for display.

Storage resources 2552 and/or DB resources 2554 may be configured and provisioned for storing, accessing, and managing RVT/E data including but not limited to: pre-recorded video and new video content generated using RVT/E system 2510; 3D data and 3D object models, and other 3D graphics data such as textures, surfaces, and effects; user information and client device information; and information and data related to videos and video content such as information about particular objects. As noted above, storage resources 2552 may also store machine images of components or modules of RVT/E system 2510. In at least some embodiments, RVT/E data including but not limited to video, 3D graphics data, object data, and user information may be accessed from and stored/provided to one or more sources or destinations eternal to RVT/E system 2510 on provider network 2500 or external to provider network 2500.

Example Streaming Service Implementation

FIG. 13 illustrates an example network-based environment in which a streaming service 2504 is used to provide rendered video and sound to RVT/E clients, according to at least some embodiments. In at least some embodiments, an RVT/E environment may include an RVT/E system 2600 and one or more client devices 2680. The RVT/E system 2600 has access to stores or other sources of pre-rendered, pre-recorded video, shown as video source(s) 2650. In at least some embodiments, the RVT/E system 100 may also have access to stores or other sources of data and information including but not limited to 3D graphics data and user information such as viewer profiles, shown as data source(s) 2660.

RVT/E system 2600 may include a front-end streaming service interface 2602 (e.g., an application programming interface (API)) for receiving input from RVT/E clients 2682 and streaming output to RVT/E clients 2682, and backend data interface(s) 2603 for storing and retrieving data including but not limited to video, object, user, and other data and information as described herein. The streaming service interface 2602 may, for example, be implemented according to a streaming service 2504 as illustrated in FIG. 12. RVT/E system 2600 may also include video playback and recording 2606 module(s), 3D graphics processing and rendering 2608 module(s), and RVT/E control module 2604.

In response to user selection of a video for playback, video playback and recording 2606 module(s) may obtain pre-rendered, pre-recorded video from a video source 2650, process the video as necessary, and stream the pre-recorded video to the respective client device 2680 via streaming service interface 2602. During an RVT/E event in which the user pauses a video being played back, steps into a scene, and explores and possibly modifies the scene, 3D graphics processing and rendering 2608 module may obtain 3D data from one or more data sources 2660, generate a 3D modeled world for the scene according to the 3D data, render 2D representations of the 3D modeled world from user-controlled camera viewpoints, and stream the real-time rendered video to the respective client device 2680 via streaming service interface 2602. In at least some embodiments, the newly rendered video content can be recorded by video playback and recording 2606 module(s).

The RVT/E system 2600 may also include an RVT/E control module 2604 that receives input and interactions from an RVT/E client 2682 on a respective client device 2680 via streaming service interface 2602, processes the input and interactions, and directs operations of video playback and recording 2606 module(s) and 3D graphics processing and rendering 2608 module accordingly. In at least some embodiments, RVT/E control module 2604 may also track operations of video playback and recording 2606 module(s). For example, RVT/E control module 104 may track playback of a given video through video playback and recording 2606 module(s). module so that RVT/E control module 2604 can determine which scene is currently being played back to a given client device 180.

In at least some embodiments, RVT/E client 2682 may implement a streaming service client interface as RVT/E client interface 2684. User interactions with a video being played back to the client device 2680, for example using RVT/E controls 188 as shown in FIG. 5C and as implemented on the client device 2680, may be sent from client device 2680 to RVT/E system 2600 according to the streaming service interfaces 2684 and 2602. Rather than performing rendering of new 3D content on the client device 2680, 3D graphics processing and rendering 2608 module(s) of RVT/E system 2600 may generate and render new video content for scenes being explored in real-time in response to the user input received from RVT/E client 2680. Streaming service interface 2602 may stream video content from RVT/E system 2699 to RVT/E client 2682 according to a streaming protocol. At the client device 2680, the RVT/E client interface 2685 receives the streamed video, extracts the video from the stream protocol, and provides the video to the RVT/E client 2682, which displays the video to the client device 2680.

Example Provider Network Environment

Embodiments of real-time video targeting (RVT) and/or real-time video explorer (RVE) systems and methods as described herein may be implemented in the context of a service provider that provides resources (e.g., computing resources, storage resources, database (DB) resources, etc.) on a provider network to clients of the service provider. FIG. 14 illustrates an example service provider network environment in which embodiments of RVT/E systems may be implemented. FIG. 14 schematically illustrates an example of a provider network 2910 that can provide computing and other resources to users 2900a and 2900b (which may be referred herein singularly as user 2900 or in the plural as users 2900) via user computers 2902a and 2902b (which may be referred herein singularly as computer 2902 or in the plural as computers 2902) via a intermediate network 2930. Provider network 2910 may be configured to provide the resources for executing applications on a permanent or an as-needed basis. In at least some embodiments, resource instances may be provisioned via one or more provider network services 2911, and may be rented or leased to clients of the service provider, for example to an RVT/E system provider 2970. At least some of the resource instances on the provider network 2910 (e.g., computing resources) may be implemented according to hardware virtualization technology that enables multiple operating systems to run concurrently on a host computer (e.g., a host 2916), i.e. as virtual machines (VMs) 2918 on the host.

The computing resources provided by provider network 2910 may include various types of resources, such as gateway resources, load balancing resources, routing resources, networking resources, computing resources, volatile and non-volatile memory resources, content delivery resources, data processing resources, data storage resources, database resources, data communication resources, data streaming resources, and the like. Each type of computing resource may be general-purpose or may be available in a number of specific configurations. For example, data processing resources may be available as virtual machine instances that may be configured to provide various services. In addition, combinations of resources may be made available via a network and may be configured as one or more services. The instances may be configured to execute applications, including services such as application services, media services, database services, processing services, gateway services, storage services, routing services, security services, encryption services, load balancing services, and so on. These services may be configurable with set or custom applications and may be configurable in size, execution, cost, latency, type, duration, accessibility, and in any other dimension. These services may be configured as available infrastructure for one or more clients and can include one or more applications configured as a platform or as software for one or more clients.

These services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources consisting of many processors, large amounts of memory and/or large storage capacity, and small resources consisting of fewer processors, smaller amounts of memory and/or smaller storage capacity. Customers may choose to allocate a number of small processing resources as web servers and/or one large processing resource as a database server, for example.

Provider network 2910 may include hosts 2916a and 2916b (which may be referred herein singularly as host 2916 or in the plural as hosts 2916) that provide computing resources. These resources may be available as bare metal resources or as virtual machine instances 2918a-d (which may be referred herein singularly as virtual machine instance 2918 or in the plural as virtual machine instances 2918). Virtual machine instances 2918c and 2918d are shared state virtual machine ("SSVM") instances. The SSVM virtual machine instances 2918c and 2918d may be configured to perform all or any portion of the real-time video targeting and explorer (RVT/E) system and RVT/E methods as described herein. As should be appreciated, while the particular example illustrated in FIG. 14 includes one SSVM 2918 virtual machine in each host, this is merely an example. A host 2916 may include more than one SSVM 2918 virtual machine or may not include any SSVM 2918 virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 14, intermediate network 2930 may, for example, be a publicly accessible network of linked networks and possibly operated by various distinct parties, such as the Internet. In other embodiments, intermediate network 2930 may be a local and/or restricted network, such as a corporate or university network that is wholly or partially inaccessible to non-privileged users. In still other embodiments, intermediate network 2930 may include one or more local networks with access to and/or from the Internet.

Intermediate network 2930 may provide access to one or more client devices 2902. User computers 2902 may be computing devices utilized by users 2900 or other customers of provider network 2910. For instance, user computer 2902a or 2902b may be a server, a desktop or laptop personal computer, a tablet computer, a wireless telephone, a personal digital assistant (PDA), an e-book reader, a game console, a set-top box or any other computing device capable of accessing provider network 2910 via wired and/or wireless communications and protocols. In some instances, a user computer 2902a or 2902b may connect directly to the Internet (e.g., via a cable modem or a Digital Subscriber Line (DSL)). Although only two user computers 2902a and 2902b are depicted, it should be appreciated that there may be multiple user computers.

User computers 2902 may also be utilized to configure aspects of the computing, storage, and other resources provided by provider network 2910 via provider network services 2911. In this regard, provider network 2910 might provide a gateway or web interface through which aspects of its operation may be configured through the use of a web browser application program executing on a user computer 2902. Alternatively, a stand-alone application program executing on a user computer 2902 might access an application programming interface (API) exposed by a service 2911 of provider network 2910 for performing the configuration operations. Other mechanisms for configuring the operation of various resources available at provider network 2910 might also be utilized.

Hosts 2916 shown in FIG. 14 may be standard host devices configured appropriately for providing the computing resources described above and may provide computing resources for executing one or more services and/or applications. In one embodiment, the computing resources may be virtual machine instances 2918. In the example of virtual machine instances, each of the hosts 2916 may be configured to execute an instance manager 2920a or 2920b (which may be referred herein singularly as instance manager 2920 or in the plural as instance managers 2920) capable of executing the virtual machine instances 2918. An instance manager 2920 may be a hypervisor or virtual machine monitor (VMM) or another type of program configured to enable the execution of virtual machine instances 2918 on a host 2916, for example. As discussed above, each of the virtual machine instances 2918 may be configured to execute all or a portion of an application or service.

In the example provider network 2910 shown in FIG. 14, a router 2914 may be utilized to interconnect the hosts 2916a and 2916b. Router 2914 may also be connected to gateway 2940, which is connected to intermediate network 2930. Router 2914 may be connected to one or more load balancers, and alone or in combination may manage communications within provider network 2910, for example, by forwarding packets or other data communications as appropriate based on characteristics of such communications (e.g., header information including source and/or destination addresses, protocol identifiers, size, processing requirements, etc.) and/or the characteristics of the network (e.g., routes based on network topology, subnetworks or partitions, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example provider network 2910 shown in FIG. 14, a host manager 2915 may also be employed to at least in part direct various communications to, from and/or between hosts 2916a and 2916b. While FIG. 14 depicts router 2914 positioned between gateway 2940 and host manager 2915, this is given as an example configuration and is not intended to be limiting. In some cases, for example, host manager 2915 may be positioned between gateway 2940 and router 2914. Host manager 2915 may, in some cases, examine portions of incoming communications from user computers 2902 to determine one or more appropriate hosts 2916 to receive and/or process the incoming communications. Host manager 2915 may determine appropriate hosts to receive and/or process the incoming communications based on factors such as an identity, location or other attributes associated with user computers 2902, a nature of a task with which the communications are associated, a priority of a task with which the communications are associated, a duration of a task with which the communications are associated, a size and/or estimated resource usage of a task with which the communications are associated and many other factors. Host manager 2915 may, for example, collect or otherwise have access to state information and other information associated with various tasks in order to, for example, assist in managing communications and other operations associated with such tasks.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that provider network 2910 described in FIG. 14 is given by way of example and that other implementations might be utilized. Additionally, it should be appreciated that the functionality disclosed herein might be implemented in software, hardware or a combination of software and hardware. Other implementations should be apparent to those skilled in the art. It should also be appreciated that a host, server, gateway or other computing device may comprise any combination of hardware or software that can interact and perform the described types of functionality, including without limitation desktop or other computers, database servers, network storage devices and other network devices, PDAs, tablets, cell phones, wireless phones, pagers, electronic organizers, Internet appliances, television-based systems (e.g., using set top boxes and/or personal/digital video recorders), game systems and game controllers, and various other consumer products that include appropriate communication and processing capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Illustrative System

In at least some embodiments, a computing device that implements a portion or all of the technologies as described herein may include a general-purpose computer system that includes or is configured to access one or more computer-readable media, such as computer system 3000 illustrated in FIG. 15. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040.

CONCLUSION

Various embodiments may further include receiving, sending or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
one or more network-based computing devices comprising one or more processors and one or more memories storing program instructions executable by the one or more processors to implement a real-time video targeting (RVT) system to:
begin playback of a pre-recorded video to a plurality of client devices; and
for each of two or more of the client devices to which the pre-recorded video is being played back, during playback of the pre-recorded video:
obtain information about a viewer associated with the respective client device;
generate one or more objects targeted at the viewer according to the viewer's information;
render a plurality of new video frames for one or more scenes to add the one or more objects to the one or more scenes to produce a merged video that includes at least some content from the pre-recorded video and the one or more objects targeted at the viewer; and
stream, over a packet-based network, the merged video for the one or more scenes to the respective client device associated with the viewer, wherein the streamed merged video includes the at least some content from the pre-recorded video and the one or more objects targeted at the viewer;
wherein the one or more objects added to the one or more scenes in the pre-recorded video that is streamed is different for at least two of the two or more client devices.

2. The system as recited in claim 1, wherein the viewer's information includes one or more preferences of the viewer, and wherein the program instructions are further executable to dynamically determine at least a portion of the one or more objects to be added to the one or more scenes according to the viewer's preferences.

3. The system as recited in claim 1, wherein renderings of the one or more objects represent one or more particular products or brands, wherein the one or more particular products or brands are determined according to the viewer's information.

4. The system as recited in claim 1, wherein, to generate one or more objects targeted at the viewer according to the viewer's information, the program instructions are further executable to:
obtain graphics data for one or more objects in the pre-recorded video according to the viewer's information;
generate models of the objects according to the graphics data; and
render the one or more objects according to the generated models of the objects.

5. The system as recited in claim 4, wherein the models of the objects are three-dimensional (3D) models.

6. The system as recited in claim 1, wherein the program instructions are further executable to, during playback of the pre-recorded video:
receive input from one of the plurality of client devices indicating interactions by the respective viewer with video content of a scene in the pre-recorded video being played back to the client device;
generate modified video content at least in part according to the viewer's interactions with the video content of the scene in the pre-recorded video;
render new video of the scene to add the modified video content to the scene in the pre-recorded video; and
stream the new video of the scene in the pre-recorded video including the modified video content to the client device.

7. The system as recited in claim 6, wherein the input is received from the client device according to an application programming interface (API) of the RVT system.

8. The system as recited in claim 1, wherein the one or more computing devices that implement the RVT system are on a provider network, and wherein the RVT system is configured to leverage one or more computing resources of the provider network to perform said generating one or more objects and said rendering new video frames in real time during playback of the pre-recorded video to the plurality of client devices.

9. The system recited in claim 1, wherein the program instructions are further executable to perform:
obtain graphics data for a particular product or brand from an external data source comprising a manufacturer, vendor, dealer or distributor data source for the particular product or brand;
wherein said generate the one or more objects targeted at the viewer is based at least in part on the graphics data obtained from the external data source.

10. A method, comprising:
performing, by a real-time video targeting (RVT) system implemented on one or more network-based computing devices:
sending at least a portion of a pre-recorded video to two or more client devices;
obtaining profiles associated with the two or more client devices;
for each of the two or more client devices:
generating, during playback of the pre-recorded video to the respective client device, one or more objects targeted at the client device according to the respective profile;
rendering new video frames for one or more scenes in the pre-recorded video to add one or more objects to the one or more scenes to produce a merged video that includes at least some content from the pre-recorded video and the one or more objects targeted based on the respective profile; and
streaming, over a packet-based network, the merged video for the one or more scenes to the respective client device associated with the respective profile, wherein the merged video that is sent includes the at least some content from the pre-recorded video and the one or more objects targeted based on the respective profile;
wherein the one or more objects added to the one or more scenes in the pre-recorded video is different for at least two of the two or more client devices.

11. The method as recited in claim 10, wherein the profile indicates one or more preferences of a viewer or viewer group, and wherein at least a portion of the one or more objects is determined according to the one or more preferences.

12. The method as recited in claim 10, wherein the profile indicates demographic or historical information for a viewer or viewer group, and wherein at least a portion of the one or more objects is determined according to the demographic or historical information.

13. The method as recited in claim 10, wherein renderings of the one or more objects represent one or more particular products or brands, wherein the one or more particular products or brands are determined according to the profile.

14. The method as recited in claim 10, wherein said generating one or more objects targeted at the client device according to the profile comprises:
   obtaining graphics data for one or more objects in the video according to the profile;
   generating models of the objects according to the graphics data; and
   rendering the one or more objects according to the generated models of the objects.

15. The method as recited in claim 14, wherein the models of the objects are three-dimensional (3D) models.

16. The method as recited in claim 10, further comprising:
   receiving input from one of the two or more client devices indicating interactions by a viewer with video content of a scene in the pre-recorded video being played back to the client device;
   generating modified video content at least in part according to the viewer's interactions with the video content of the scene in the pre-recorded video;
   rendering new video for the scene in the pre-recorded video to add the new video content to the pre-recorded video; and
   sending the new video of the scene in the pre-recorded video including the modified video content to the client device.

17. The method recited in claim 10, further comprising:
   obtaining graphics data for a particular product or brand from an external data source comprising a manufacturer, vendor, dealer or distributor data source for the particular product or brand;
   wherein said generating the one or more objects targeted at the viewer comprises generating new video content based at least in part on the graphics data obtained from the external data source.

18. A non-transitory computer-readable storage medium storing program instructions that when executed on one or more computers cause the one or more computers to implement a real-time video targeting (RVT) system configured to:
   begin playback of at least a portion of a pre-recorded video to a plurality of client devices;
   for each of the plurality of client devices, during playback of the pre-recorded video:
      obtain information about one or more viewers associated with the client device;
      generate one or more objects targeted at the one or more viewers according to the one or more viewers' respective information;
      render new video frames for one or more scenes to add the one or more objects to the one or more scenes to produce a merged video that includes at least some content from the pre-recorded video and the one or more objects targeted at the viewer; and
      stream, over a packet-based network, the merged video for the one or more scenes to the client device associated with the viewer, wherein the streamed merged video includes the at least some content from the pre-recorded video and the one or more objects associated with the one or more viewers for the respective client device;
   wherein the one or more objects added to the one or more scenes in the pre-recorded video is different for at least two of the plurality of client devices.

19. The non-transitory computer-readable storage medium as recited in claim 18, wherein the information about one or more viewers associated with a given client device indicates one or more preferences of the respective one or more viewers, and wherein at least a portion of the one or more objects targeted at the respective one or more viewers associated with a given client device is determined according to the one or more preferences of the respective one or more viewers.

20. The non-transitory computer-readable storage medium as recited in claim 18, wherein the information about one or more viewers associated with a given client device indicates demographic or historical information for the respective one or more viewers, and wherein at least a portion of the one or more objects targeted at the respective one or more viewers associated with a given client device is determined according to the demographic or historical information of the respective one or more viewers.

21. The non-transitory computer-readable storage medium as recited in claim 18, wherein renderings of the one or more objects targeted at the one or more viewers associated with a given client device include renderings that advertise or market particular products or brands to the respective one or more viewers, wherein the particular products or brands are determined according to the respective information.

22. The non-transitory computer-readable storage medium as recited in claim 18, wherein the RVT system is further configured to, during playback of the pre-recorded video:
   generate modified video content at least in part according to viewer interaction with video content of a scene in the pre-recorded video received from one of the client devices;
   render new video of the scene to add the modified video content to the scene in the pre-recorded video; and
   stream the new video of the scene in the pre-recorded video including the modified video content to the respective client device.

* * * * *